United States Patent
Teboulle et al.

(10) Patent No.: US 11,146,421 B2
(45) Date of Patent: Oct. 12, 2021

(54) TRANSMISSION OF MESSAGES BETWEEN A TERMINAL, A GATEWAY AND A SERVER USING A RELAY IN AN LPWAN COMMUNICATION SYSTEM

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 191 days.

(21) Appl. No.: 16/341,302

(22) PCT Filed: Oct. 10, 2017

(86) PCT No.: PCT/EP2017/075757
§ 371 (c)(1),
(2) Date: Apr. 11, 2019

(87) PCT Pub. No.: WO2018/069284
PCT Pub. Date: Apr. 19, 2018

(65) Prior Publication Data
US 2020/0127873 A1  Apr. 23, 2020

(30) Foreign Application Priority Data
Oct. 13, 2016  (FR) ........................... 16/59900

(51) Int. Cl.
*H04W 88/16* (2009.01)
*H04L 12/66* (2006.01)
(Continued)

(52) U.S. Cl.
CPC .............. *H04L 12/66* (2013.01); *H04B 7/15* (2013.01); *H04L 12/4633* (2013.01);
(Continued)

(58) Field of Classification Search
CPC ...... H04L 2012/5675; H04W 72/0446; H04W 88/16; H04J 3/00; H04B 7/15
See application file for complete search history.

(56) References Cited

U.S. PATENT DOCUMENTS

| | | | |
|---|---|---|---|
| 2005/0080659 A1* | 4/2005 | Takeda | G06Q 10/0637 705/7.36 |
| 2017/0048852 A1* | 2/2017 | Li | H04W 72/0446 |
| 2018/0164398 A1* | 6/2018 | Olsen | G01S 5/021 |

OTHER PUBLICATIONS

"A technical overview of LoRa® and LoRaWAN™", Jun. 2016, pp. 1-20 (Year: 2016).*

(Continued)

*Primary Examiner* — Salvador E Rivas
(74) *Attorney, Agent, or Firm* — Oliff PLC; R. Brian Drozd

(57) ABSTRACT

An LPWAN communication system includes server equipment, at least one gateway and at least one relay. Each gateway communicates with terminals using a Class A communication mode, wherein any response intended for a terminal uses a reception window defined with respect to a transmission time of an original message by said terminal. Each relay is seen as a terminal by each gateway, and communicates with terminals in accordance with a Class A' communication mode, defined as follows: the relay transmits beacons at regular intervals and listens out to terminals only during timeslots defined with respect to said beacons. In this Class A' communication mode, the relay propagates any response toward a terminal using at least one other reception window defined with respect to a transmission time of an original message by said terminal.

15 Claims, 8 Drawing Sheets

(51) Int. Cl.
    *H04L 12/46*     (2006.01)
    *H04W 40/24*     (2009.01)
    *H04W 72/04*     (2009.01)
    *H04B 7/15*     (2006.01)
    *H04J 3/00*     (2006.01)

(52) U.S. Cl.
CPC ..... *H04W 40/244* (2013.01); *H04W 72/0446* (2013.01); *H04W 88/16* (2013.01); *H04J 3/00* (2013.01)

(56) References Cited

OTHER PUBLICATIONS

Vilajosana et al., "Transmission of IPv6 Packets over LoRaWAN", Jul. 8, 2016, pp. 1-11 (Year: 2016).*
Jan. 25, 2018 International Search Report issued in International Patent Application No. PCT/EP2017/075757.
Raza et al; "Low Power Wide Area Networks; A Survey;" pp. 1-15; Jun. 23, 2016.
Augustin et al; "A Study of LoRa: Long Range & Low Power Networks for the Internet of Things;" Sensors; pp. 1-18; Sep. 9, 2016.

* cited by examiner

TRANSMISSION OF MESSAGES BETWEEN A TERMINAL, A GATEWAY AND A SERVER USING A RELAY IN AN LPWAN COMMUNICATION SYSTEM

The present invention relates to a relay mechanism between one or more terminals and one or more gateways in an LPWAN (low-power wide-area network) communication system.

The Internet of Things is emerging. The Internet of Things represents the extension of the internet to things and to places in the physical world. Whereas the internet does not normally extend beyond the electronic world, the Internet of Things represents exchanges of information and data coming from devices present in the real world to the Internet, such as for example for making a collection of gas or water consumption readings, or collections of sensor measurements in a general way. The Internet of Things is considered to be the third evolution of the internet, referred to as Web 3.0. The Internet of Things has a universal character for designating communicating objects, referred to as "connected objects", for varied uses, for example in the industrial, food, e-health or home-automation fields. These connected objects are typically terminals with a low energy consumption, on standby most of the time, and waking up from time to time to collect data (sensors) and for transmitting by radio.

In the context of the Internet of Things, gateways situated at geographically high points are deployed on behalf of a service operator for creating a network infrastructure to enable these connected objects to communicate. Apart from maintenance operations, these gateways are typically fixed and permanent. Mention can for example be made in respect of this model of SigFox (registered trade mark) or ThingPark (registered trade mark) networks. These gateways communicate with the connected objects by means of medium- or long-range LPWAN wireless communication systems, such as for example the LoRaWAN (registered trade mark, "long-range wide-area network") technology, also known by the abbreviation "LoRa" (registered trade mark, "long range" from the name of the alliance promoting LoRaWAN (registered trade mark) long-range wide-area network technologies. These gateways enable these connected objects to communicate with a server (the network core), referred to as the LNS (standing for "LoRa network server", in accordance with the LoRaWAN technology terminology), typically for transferring data collected by said connected objects. The gateways communicate with the LNS server by means of a network infrastructure, typically cabled, suitable for supporting the load of the data traffic exchanged between said connected objects, said gateways and the LNS server. It should be noted that the exchanges between the gateways and the LNS server in general use a proprietary protocol specific to the service operator (not standardised) based on the IP protocol (Internet Protocol, as defined in the RFC 791 normative document).

One problem with which the service operator is confronted is that some connected objects may be out of radio range of the LPWAN communication system. This may be due to the fact that a previously installed gateway was disconnected for maintenance or that a given geographical area is not yet covered for the deployment of gateways of the service operator. Installing a gateway is time consuming since the functioning of such a gateway (permanently listening out on the medium) requires a mains electrical supply. It is therefore desirable to provide a solution that makes it possible to overcome, quickly and at low cost, a defect in radio range of the LPWAN communication system, so as to enable connected objects that are out of radio range of the gateways already present in the LPWAN communication system to benefit from the services of said communication system. It is in particular desirable to provide a solution that consumes little power, in particular in comparison with the gateways of the LPWAN communication system. It is also desirable to provide a solution that is ready for use ("plug and play").

To do this, the invention relates to a transmission method in a communication system including server equipment and at least one gateway connected to the server equipment, each gateway being configured to communicate with at least one terminal via an LPWAN communication network by using a so-called Class A communication mode defined as follows: said gateway receives an original message coming from one said terminal and propagates said received original message toward the server equipment; on reception of a response message from the server equipment, said gateway propagates the response message toward said terminal using at least one reception window defined with respect to a transmission time of said original message by said terminal. The method is such that the communication system further includes at least one relay seen as a terminal by each gateway, each relay using the Class A communication mode for communicating with one or more of said gateways, and using, to communicate with one or more terminals, another communication mode, referred to as Class A', defined as follows: the relay transmits beacons at regular intervals, each beacon including information representing at least one timeslot predefined with respect to said beacon; the relay listens out for any original messages sent by one or more terminals, toward the server equipment, only during each said timeslot; in the case of a response message from the server equipment provided via one said gateway in Class A communication mode, said relay propagates the response message toward said terminal using at least one other reception window defined with respect to a transmission time of said original message by said terminal, each said other reception window being offset subsequently by a predefined time with respect to each reception window defined in Class A communication mode. In addition, on reception by one said relay of an original message sent by one said terminal in Class A' communication mode, said relay performs: performing an encapsulation of the original message in another message intended for the server equipment; transmitting said other message in Class A communication mode so that at least one said gateway propagates said other message toward the server equipment; in the case of a response message from the server equipment provided via one said gateway using a reception window defined in Class A communication mode with respect to the transmission of said other message by said relay, performing a de-encapsulation of another response message contained in said response message and propagating said other response message toward said terminal in one said other reception window defined in Class A' communication mode with respect to the transmission of said original message by said terminal. Furthermore, on reception of a message propagated by one or more gateways, when the received message includes a message relayed by one said relay, the server equipment performs: performing a de-encapsulation of the relayed message; processing the relayed message for obtaining a response message to be addressed to the terminal that sent the message that was relayed; performing an encapsulation of the response message in another response message to be addressed to the relay; and transmitting said other response message toward a gateway so that said gateway propagates said other response message toward said relay in one said reception window defined in Class A communication mode with respect to the transmission by said terminal of said propagated message.

Thus a defect in radio range of the LPWAN communication system is mitigated so as to enable terminals (connected objects) that are outside radio range of the gateways already present in the LPWAN communication system to benefit from the services of said communication system. This benefit is achieved at low cost since the relay can be on standby for the majority of the time, by virtue particularly of the definition of the Class A' communication mode.

According to a particular embodiment, each relay is initialised as follows: said relay transmits a registration message to the server equipment; in the case of a response message from the server equipment provided via one said gateway, the relay transmits a beacon parameter recovery message toward the server equipment; in the case of a response message from the server equipment provided via one said gateway, the relay schedules the sending of said beacons and schedules listening out during each said timeslot, said response message including information representing each said timeslot.

Thus, the relay is ready for use and the radio range of the LPWAN communication system can be quickly extended.

According to a particular embodiment, on reception by one said relay of an original message sent by one said terminal in Class A' communication mode, the relay performs: when the original message is a registration message from the said terminal to the server equipment, said relay propagates said original message toward the server equipment and, on reception of a response message coming from the server equipment, said relay considers that said terminal is attached to said relay; when the original message is another message, said relay propagates said original message toward the server equipment only if said terminal is attached to said relay.

Thus, the exchanges are limited in the case of the presence of a plurality of relays that would use the same timeslots for listening out to any messages to be relayed to the server equipment, avoiding each relay being responsible for propagating any such messages. This also preserves the power resource of the relays.

According to a particular embodiment, on reception of a message propagated by one or more gateways, when the received message includes a message relayed by one said relay, the server equipment determines whether the relayed message has also been received directly via at least one said gateway and, if such is the case, the server equipment performs: processing the relayed message for obtaining a response message to be addressed to the terminal that sent the message that has been relayed; transmitting said response message to a gateway so that said gateway propagates said response message to said terminal in one said reception window defined in Class A communication mode with respect to the transmission by said terminal of the message that was relayed; transmitting to the relay a detachment message indicating to said relay that said terminal is no longer attached to said relay. In addition, the terminal listens out in each said reception window defined in Class A communication mode and in each said reception window defined in Class A' communication mode and, when said terminal receives a response message in one said reception window defined in Class A communication mode, said terminal switches into Class A communication mode.

Thus, it is prevented that a relay continues propagating messages transmitted by a terminal, when said terminal is now within range of at least one gateway in the communication system.

According to a particular embodiment, two reception windows are defined in Class A communication mode and two reception windows are defined in Class A' communication mode.

According to a particular embodiment, each reception window in Class A' communication mode is of a duration greater than each corresponding reception window in Class A communication mode.

Thus, it is possible to use relays having a lower clock precision than that of the gateways of the communication system, and account is taken of the degradations in quality of clocks due to successive synchronisations.

According to a particular embodiment, the server equipment comprises at least one relay application, each relay application being responsible for performing the encapsulations and de-encapsulations vis-à-vis one or more of said relays.

Thus, the architecture of the server equipment is simple.

The invention also relates to a method implemented by a relay in the context of a transmission in a communication system including server equipment and at least one gateway connected to the server equipment, each gateway being configured to communicate with at least one terminal via an LPWAN communication network using a so-called Class A communication mode defined as follows: said terminal wishing to communicate with the server equipment directly via one said gateway transmits an original message to the server equipment; said terminal listens out for any response message from the server equipment propagated via one said gateway during at least one reception window defined with respect to a transmission time for said original message by said terminal. In addition, the communication system further includes said relay, which is seen as a terminal by each gateway, said relay using the Class A communication mode to communicate with one or more said gateways, and using, to communicate with one or more terminals, another communication mode, referred to as Class A', defined as follows: the relay transmits beacons at regular intervals, each beacon including information representing at least one timeslot predefined with respect to said beacon; the relay listens out for any original messages sent by one or more terminals to the server equipment only during each said timeslot; in the case of a response message from the server equipment provided via one said gateway in Class A communication mode, said relay propagates the response message toward said terminal using at least one other reception window defined with respect to a transmission time for said original message by said terminal, each said other reception window being offset subsequently by a predefined time with respect to each reception window defined in Class A communication mode. In addition, on reception by said relay of an original message sent by one said terminal in Class A' communication mode, said relay performs: performing an encapsulation of the original message in another message intended for the server equipment, transmitting said other message in Class A communication mode so that at least one said gateway propagates said other message toward the server equipment; in the case of a response message from the server equipment provided via one said gateway using a reception window defined in Class A communication mode with respect to the transmission of said other message via said relay, performing a de-encapsulation of another response message contained in said response message and propagating said other response message toward said terminal in one said other reception window defined in Class A' communication mode with respect to the transmission of said original message by said terminal.

The invention also relates to a method implemented by a terminal in the context of a transmission in a communication system including server equipment and at least one gateway connected to the server equipment, said terminal being configured to communicate with at least one said gateway via an LPWAN communication network using a so-called Class A communication mode, defined as follows: said terminal wishing to communicate with the server equipment directly via one said gateway transmits an original message to the server equipment; said terminal listens out for any response message from the server equipment propagated via one said gateway during at least one reception window defined with respect to a transmission time for said original message by said terminal. In addition, the communication system further including at least one relay, said terminal is configured to communicate with each relay in accordance with another so-called Class A' communication mode, defined as follows: the terminal receives beacons sent by one said relay, each beacon including information representing at least one timeslot predefined with respect to said beacon; said terminal wishing to communicate with the server equipment via said relay transmits an original message to the server equipment only during one said timeslot; and said terminal listens out for any response message from the server equipment propagated via said relay during at least one other reception window defined with respect to a transmission time for said original message by said terminal, each said other reception window being offset subsequently by a predefined time with respect to each reception window defined in Class A communication mode.

The invention also relates to a method implemented by server equipment in the context of a transmission in a communication system including said server equipment and at least one gateway connected to the server equipment, each gateway being configured to communicate with at least one terminal via an LPWAN communication system. The method is such that, the communication system further including at least one relay, on reception of a message propagated by one or more gateways, when the received message includes a message relayed by one said relay, the server equipment performs: performing a de-encapsulation of the relayed message; processing the relayed message for obtaining a response message to be addressed to the terminal that sent the message that was relayed; encapsulating the response message in another response message to be addressed to the relay; and transmitting said other response message to a gateway, so that said gateway propagates said other response message toward said relay.

The invention also relates to a communication system including server equipment and at least one gateway connected to the server equipment, each gateway being configured to communicate with at least one terminal via an LPWAN communication network using a so-called Class A communication mode, defined as follows: said gateway is configured to receive an original message coming from one said terminal and propagates said received original message toward the server equipment; on reception of a response message from the server equipment, said gateway is configured to propagate the response message toward said terminal using at least one reception window defined with respect to a transmission time of said original message by said terminal. In addition, the communication system further includes at least one relay seen as a terminal by each gateway, each relay being configured to use the Class A communication mode to communicate with one or more of said gateways, and to use, to communicate with one or more terminals, another so-called Class A' communication mode, defined as follows: the relay is configured to transmit beacons at regular intervals, each beacon including information representing at least one timeslot predefined with respect to said beacon; the relay is configured so as to listen out for any original messages sent by one or more terminals to the server equipment only during each said timeslot; in the case of a response message from the server equipment provided via one said gateway in Class A communication mode, said relay is configured to propagate the response message toward said terminal using at least one other reception window defined with respect to a transmission time of said original message by said terminal, each said other reception window being offset subsequently by a predefined time with respect to each reception window defined in Class A communication mode. In addition, on reception by one said relay of an original message sent by one said terminal in Class A' communication mode, said relay implements: means for performing an encapsulation of the original message in another message intended for the server equipment; means for transmitting said other message in Class A communication mode, so that at least one said gateway propagates said other message toward the server equipment; in the case of a response message from the server equipment provided via one said gateway using a reception window defined in Class A communication mode with respect to the transmission of said other message by said relay, means for performing a de-encapsulation of another response message contained in said response message and means for propagating said other response message toward said terminal in one said other reception window defined in Class A' communication mode with respect to the transmission of said original message by said terminal. In addition, on reception of a message propagated by one or more gateways, when the received message includes a message relayed by one said relay, the server equipment implements: means for performing a de-encapsulation of the relayed message; means for processing the relayed message for obtaining a response message to be addressed to the terminal that sent the message that was relayed; means for performing an encapsulation of the response message in another response message to be addressed to the relay; and means for transmitting said other response message to a gateway so that said gateway propagates said other response message toward said relay in one said reception window defined in Class A communication mode with respect to the transmission by said terminal of said propagated message.

The invention also relates to a relay intended to be used in a communication system including server equipment and at least one gateway connected to the server equipment, each gateway being configured to communicate with at least one terminal via an LPWAN communication network using a so-called Class A communication mode, defined as follows: said terminal wishing to communicate with the server equipment directly via one said gateway is configured to transmit an original message to the server equipment; said terminal is configured so as to listen out for any response message from the server equipment propagated via one said gateway during at least one reception window defined with respect to a transmission time of said original message by said terminal. In addition, said relay being seen as a terminal by each gateway, said relay is configured to use the Class A communication mode to communicate with one or more of said gateways, and to use, for communicating with one or more terminals, another so-called Class A' communication mode, defined as follows: the relay is configured to transmit beacons at regular intervals, each beacon including information representing at least one timeslot predefined with respect to said beacon; the relay is configured so as to listen out for any original messages sent by one or more terminals to the server equipment only during each said timeslot; in the case of a response message from the server equipment provided via one said gateway in Class A communication mode, said relay is configured to propagate the response message toward said terminal using at least one other reception window defined with respect to a transmission time of said original message by said terminal, each said other reception window being offset subsequently by a time predefined with respect to each reception window defined in Class A communication mode. In addition, on reception by said relay of an original message sent by one said terminal in Class A' communication mode, said relay implements: means for performing an encapsulation of the original message in another message intended for the server equipment; means for transmitting said other message in Class A communication mode so that at least one said gateway propagates said other message toward the server equipment; in the case of a response message from the server equipment provided via one said gateway using a reception window defined in Class A communication mode with respect to the transmission of said other message by said relay, means for performing a de-encapsulation of another response message contained in said response message and means for propagating said other response message toward said terminal in one said other reception window defined in Class A' communication mode with respect to the transmission of said original message by said terminal.

The invention also relates to a terminal intended to be used with a communication system including server equipment and at least one gateway connected to the server equipment, said terminal being configured to communicate with at least one said gateway via an LPWAN communication network using a so-called Class A communication mode, defined as follows: said terminal wishing to communicate with the server equipment directly via one said gateway is configured to transmit an original message to the server equipment; said terminal is configured to listen out for any response message from the server equipment propagated via one said gateway during at least one reception window defined with respect to a transmission time of said original message by said terminal. In addition, the communication system further including at least one relay, said terminal is configured to communicate with each relay in another so-called Class A' communication mode, defined as follows: the terminal is configured to receive beacons sent by one said relay, each beacon including information representing at least one timeslot predefined with respect to said beacon; said terminal wishing to communicate with the server equipment via said relay is configured to transmit an original message to the server equipment only during one said timeslot; said terminal is configured to listen out for any response message from the server equipment propagated via said relay during at least one other reception window defined with respect to a transmission time of said original message by said terminal, each said other reception window being offset subsequently by a time predefined with respect to each reception window defined in Class A communication mode.

The invention also relates to server equipment intended to be used in a communication system including said server equipment and at least one gateway connected to the server equipment, each gateway being configured to communicate with at least one terminal via an LPWAN communication network. The communication system further including at least one relay, on reception of a message propagated by one or more gateways, when the received message includes a message relayed by one said relay, the server equipment implements: means for performing a de-encapsulation of the relayed message; means for processing the relayed message for obtaining a response message to be addressed to the terminal that sent the message that was relayed; means for performing an encapsulation of the response message in another response message to be addressed to the relay; and means for transmitting said other response message to a gateway so that said gateway propagates said other response message toward said relay.

The invention also relates to a computer program that can be stored on a medium and/or downloaded from a communication network in order to be read by a processor. This computer program comprises instructions for implementing the method mentioned above vis-à-vis the relay or the method mentioned above vis-à-vis the terminal or the method mentioned above vis-à-vis the server equipment, when said program is executed by the processor. The invention also relates to an information storage medium storing such a computer program.

The features of the invention mentioned above, as well as others, will emerge more clearly from a reading of the following description of an example embodiment, said description being given in relation to the accompanying drawings, among which:

The invention is more particularly described hereinafter in a context of a LoRaWAN (registered trade mark) network infrastructure, using in particular terminologies that are found in the LoRaWAN (registered trade mark) specifications.

The principles and implementations described below do however apply, in more general terms, to a context of an LPWAN network infrastructure.

In addition, the invention is more particularly described below using two reception windows in Class A transmission mode, as in the LoRaWAN (registered trade mark) specifications. However, it should be noted that a different number of reception windows in Class A transmission mode may be used, and in particular a single reception window in Class A transmission mode.

Figure 1:
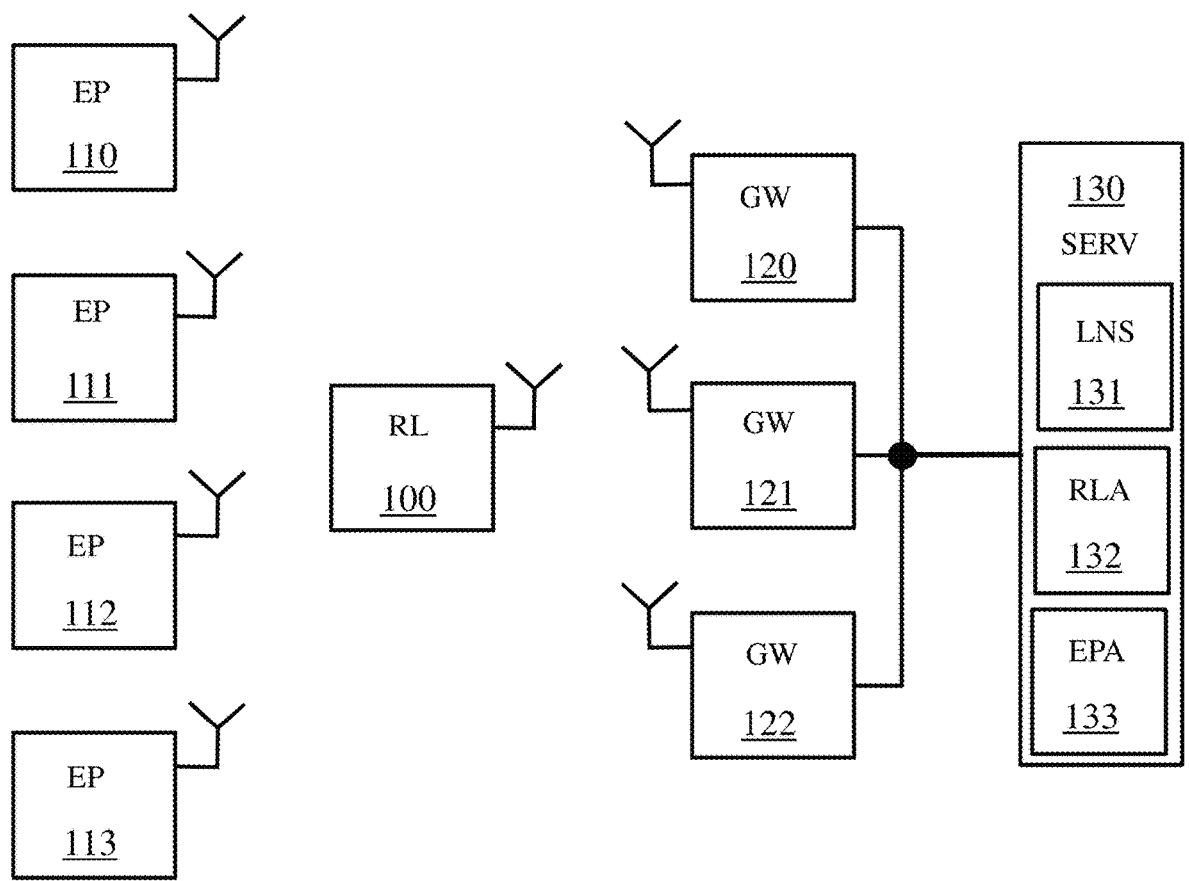
FIG. 1 illustrates schematically a communication system including server equipment, at least one gateway, at least one relay and at least one terminal.

FIG. 1 illustrates schematically a communication system in which the present invention is implemented.

The communication system comprises a plurality of gateways GW, which have respective communication links with server equipment SERV 130 to which said gateways GW are attached. According to a particular embodiment, each gateway GW integrates a function of access to the Internet and the communication link between said gateway with the server equipment SERV 130 is based on the IP protocol. Let us consider by way of illustration that the communication system comprises three gateways GW 120, 121, 122.

In the communication system, messages shall be transferred to the server equipment SERV 130 in the form of frames from each terminal EP ("End-Point") in a set of terminals EP in said communication system. Let us consider by way of illustration that the communication system comprises four terminals EP 110, 111, 112, 113.

To enable the terminals EP to communicate indirectly with the server equipment SERV 130, each gateway GW comprises a radio interface enabling said gateway to communicate with said terminals EP in reliance on a wireless communication network, and preferentially according to an LPWAN communication technology (provided that the radio range of the communication technology so permits). Said radio interface is preferentially of the LoRa (registered trade mark) type thus making it possible to implement, in the communication system, a LoRaWAN (registered trade mark) data transmission protocol.

To overcome any lack of radio range of the LPWAN communication technology, in particular when one or more gateways GW are under maintenance or waiting for the deployment of the gateways GW to be completed, the communication system includes one or more relays RL. Let us consider by way of illustration in the context of FIG. 1 that the communication system includes a single relay RL 100.

The relay RL 100 is therefore intended to be interposed between one or more terminals EP and one or more gateways GW in the communication system. The relay RL 100 therefore uses, to communicate with the terminals EP and the gateways GW, the same physical communication layer as the terminals EP or the gateways GW with each other. As detailed hereinafter, access to the communication medium is however different when the relay RL 100 is involved in the communications between the terminals EP and the server equipment SERV 130.

The relay RL 100 is a "dormant" device. This means that the relay RL 100 is on standby with the exception of the following situations:

during predetermined timeslots during which the relay RL 100 shall send beacons, as well as time periods necessary for the management of said beacons;
during predetermined timeslots during which one or more terminals EP are enabled to transmit messages to be relayed by the relay RL 100, as well as time periods necessary for management of said messages;

during predetermined timeslots during which the relay RL 100 is enabled to send responses to messages transmitted by one or more terminals EP and which the relay RL 100 has relayed, as well as time periods necessary for management of said responses;
during predetermined timeslots during which the relay RL 100 shall transmit messages to the server equipment SERV 130, as well as time periods necessary for management of said messages;
during predetermined timeslots during which any of said gateways GW 120, 121, 122 is enabled to send responses to messages sent by the relay RL 100 to the server equipment SERV 130, as well as time periods necessary for management of said responses; and
during other predetermined processing operations that are the responsibility of the relay RL 100.

The purpose of the relay RL 100 is to overcome, at less cost, the absence of a gateway GW for covering a geographical zone in which terminals EP are situated (or potentially situated). The relay RL 100 is then supplied in a self-contained manner, by battery or solar panel, and preserves its power by waking up only when this is made necessary for performing the relay between one or more terminals EP and the rest of the communication system (or when this is made necessary to carry out other predetermined processing operations for which the relay RL 100 is responsible). In order to be able to go on standby as much as possible, the relay RL 100, in its indirect communications with the server equipment SERV 130 (and therefore via one or more gateways GW), applies a first communication mechanism described below in relation to FIGS. 3A and 3B. This first communication mechanism corresponds to the so-called Class A communication mode, in the LoRaWAN (registered trade mark) data transmission protocol. In addition, the relay RL 100, in its communications with any equipment EP, applies a second communication mechanism described below in relation to FIGS. 3C, 3D and 3E. This second communication mechanism is therefore another so-called Class A' communication mode, different from the Class A communication mode (as well as different from the so-called Class B communication mode, in the LoRaWAN (registered trade mark) data transmission protocol, even if the Class A' communication mode is also based on transmissions of beacons). In order to allow establishment of these communication mechanisms, the relay RL 100 is initialised as described below in relation to FIG. 4.

In a particular embodiment of the server equipment SERV 130, the server equipment SERV 130 includes an LNS server 131, the role of which is the monitoring and collection of information from the terminals EP 110, 111, 112, 113 via the gateways GW 120, 121, 122. The server equipment SERV 130 further includes one or more terminal applications EPA 133, responsible for processing the information collected by the LNS server 131 from the terminals EP 110, 111, 112, 113 and responsible for sending responses (including acknowledgements of data and potentially commands) to the terminals EP 110, 111, 112, 113. One and the same terminal application EPA 133 may take responsibility for one or more terminals EP. In addition, in order to take into account the presence of the relay RL 100 and to make it transparent to the gateways GW 120, 121, 122, the server equipment SERV 130 further includes one or more relay applications RLA, responsible for performing encapsulation and de-encapsulation operations, as explained below in particular in relation to FIGS. 9 and 10. One and the same relay application RLA may take responsibility for one or more relays RL. The LNS server 131 is then responsible for managing the transfers of data and information within the server equipment SERV 130, more particularly vis-à-vis the terminal application EPA 133 and the relay application RLA 132.

It should be noted that the server equipment SERV 130 may consist of a single machine or a set of interconnected machines. In particular, the server equipment SERV 130 may be such that the LNS server 131 and the relay application RLA 132 on the one hand, and the terminal applications EPA 133 on the other hand, are implemented by distinct machines.

Figure 2:
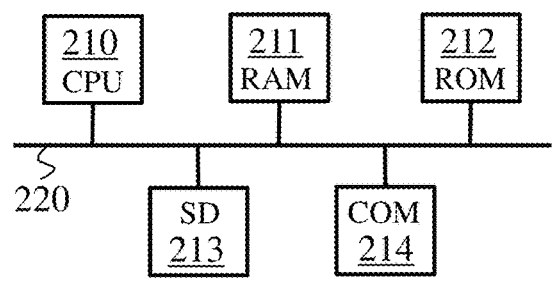
FIG. 2 illustrates schematically an example of hardware architecture of one said relay and/or of one said terminal and/or of the server equipment.

An example of hardware architecture applicable to the relays RL, to the terminals EP and to the server equipment SERV 130 is illustrated schematically by FIG. 2. Let us consider by way of illustration the case of the relay RL 100.

The relay RL 100 then comprises, connected by a communication bus 220: a processor or CPU (central processing unit) 210; a random access memory (RAM) 211; a read only memory (ROM) 212; a storage unit or a storage medium reader, such as an SD (secure digital) card reader 213; and a communication interface COM 214. The communication interface COM 214 enables the relay RL 100 to communicate with one or more gateways GW, as well as with any one or more terminals EP implementing the LPWAN communication technology.

When the example of hardware architecture represents the server equipment SERV 130, the storage unit 213 is preferably one or more hard disk drives HDD. In addition, the communication interface COM 214 then in particular enables the server equipment SERV 130 to communicate with each of the gateways GW 120, 121, 122.

When the example of hardware architecture represents a terminal EP, the communication interface COM 214 then enables in particular said terminal EP to communicate in accordance with the LPWAN communication technology (in order to communicate).

The processor 210 is capable of executing instructions loaded into the RAM 211 from the ROM 212, from an external memory, from a storage medium or from a communication network. When the relay RL 100 is powered up, the processor 210 is capable of reading instructions from the RAM 211 and executing them. These instructions form a computer program causing the implementation, by the processor 210, of all or some of the algorithms and steps described here in relation to the relay RL 100 in question. This principle applies in a similar manner to each terminal EP and to the server equipment SERV 130.

Thus, all or some of the algorithms and steps described here can be implemented in software form by the execution of a set of instructions by a programmable machine, such as a DSP (digital signal processor) or a microcontroller. All or some of the algorithms and steps described here may also be implemented in hardware form by a machine or a dedicated component, such as an FPGA (field-programmable gate array) or an ASIC (application-specific integrated circuit).

FIGS. 3A to 3E illustrate schematically sequencings of communications in the context of access to the communication medium according to the LPWAN technology in the communication system.

Figure 3A:
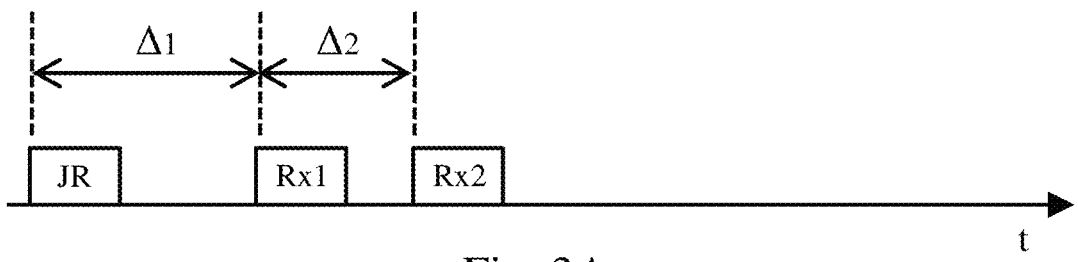
FIGS. 3A to 3E illustrate schematically sequencings of communications in the context of the communication system of FIG. 1.

FIG. 3A illustrates schematically a sequencing of communications applied when a terminal EP wishes to transmit a registration request message, called JOIN_REQUEST (JR), to the server equipment SERV 130 by communicating directly with one or more gateways GW. It should be noted that the uplink can be made via a plurality of gateways GW that receive in parallel the JOIN_REQUEST message, whereas the server equipment SERV 130 chooses a gateway GW to make the downlink. When the terminal EP wishes to transmit such a JOIN_REQUEST message, said terminal EP accesses the communication medium after having waited till a random period (bounded) has elapsed. Said terminal EP thus transmits its JOIN_REQUEST message, which defines a first reception window Rx1 and a second reception window Rx2. In response to the JOIN_REQUEST message, the terminal EP is supposed to receive a response message, called JOIN_ACCEPT, in the first reception window Rx1 or in the second reception window Rx2. This enables the terminal EP to go on standby after having sent the JOIN_REQUEST message and to know exactly at what moments to awake for receiving any response to the JOIN_REQUEST message. The first reception window Rx1 is defined at a time $\Delta 1$ with respect to the sending of the JOIN_REQUEST message and the second reception window Rx2 is defined at a time $\Delta 2$ with respect to the first reception window Rx1. For example, $\Delta 1$ is equal to 5 seconds and $\Delta 2$ is equal to 1 second. The first reception window Rx1 and the second reception window Rx2 are preferentially of the same size.

The sequencing of communications shown in FIG. 3A is also used by any relay RL in order itself to transmit a JOIN_REQUEST message to the server equipment SERV 130 by communicating with one or more gateways GW.

Figure 3B:
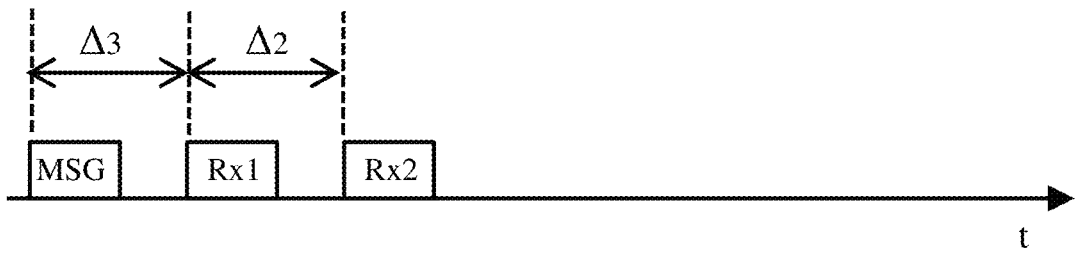

FIG. 3B illustrates schematically a sequencing of communications applied when a terminal EP wishes to transmit a service message MSG to the server equipment SERV 130 by communicating directly with one or more gateways GW. A service message MSG is a message of any type transmitted on an uplink by the terminal EP after registration with the server equipment SERV 130 (i.e. outside the JOIN_REQUEST message). When the terminal EP wishes to transmit such a service message MSG, said terminal EP accesses the communication medium after having waited until a random period (bounded) has elapsed. Said terminal EP thus transmits its service message MSG, which defines the first reception window Rx1 and the second reception window Rx2. In response to the service message MSG, the terminal EP is supposed to receive a response message in the first reception window Rx1 or in the second reception window Rx2. This enables the terminal EP to go on standby after having sent the service message and to know exactly at what moment to wake up for receiving any response to said service message. What is different compared with FIG. 3A is that the first reception window Rx1 is defined at a time $\Delta 3 < \Delta 1$ with respect to the sending of the service message MSG, the second reception window Rx1 remaining defined at a time $\Delta 2$ with respect to the first reception window Rx1. For example, $\Delta 3$ is equal to 1 second. It is in fact considered that the processing operations involved in a JOIN_REQUEST message are more time-consuming than those involved in a service message.

The sequencing of communications shown in FIG. 3B is also used by any relay RL to transmit a service message MSG (in particular with regard to the messages encapsulating messages initially transmitted by a terminal EP for which said relay RL is responsible, as detailed hereinafter) to the server equipment SERV 130 by communicating with one or more gateways GW.

The sequencings of communications shown in FIGS. 3A and 3B thus define the Class A communication mode already mentioned. A larger number of reception windows may be used. Only one reception window may also be used.

Figure 3C:
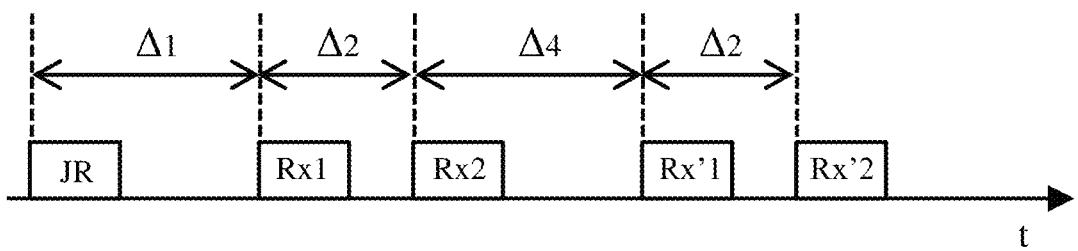
Figure 3D:
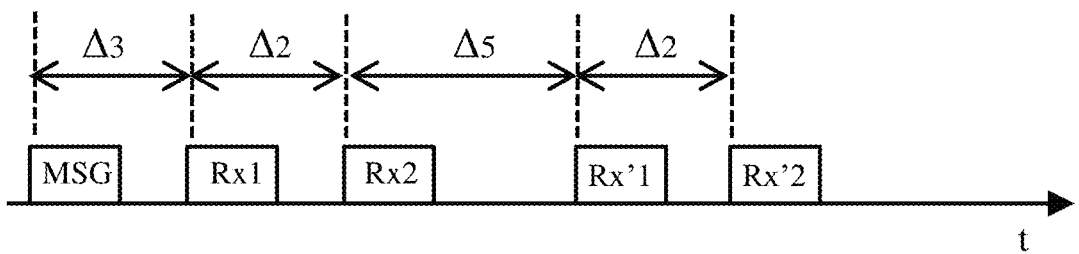
Figure 3E:
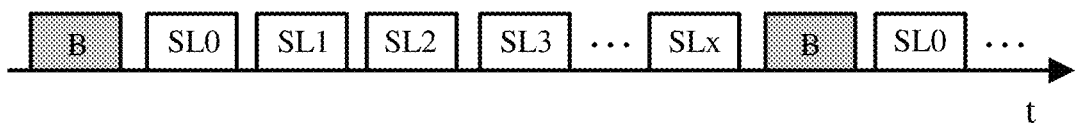

Let us consider by way of illustration in the context of FIGS. 3C, 3D and 3E that the communication system comprises only one relay RL, namely the relay RL 100.

FIG. 3C illustrates schematically a sequencing of communications applied when a terminal EP wishes to transmit a JOIN_REQUEST message to the server equipment SERV 130 relying on the relay RL 100. When the terminal EP wishes to transmit such a JOIN_REQUEST message, said terminal EP accesses the communication in a predetermined timeslot, as described hereinafter in relation to FIG. 3E. Said terminal EP thus transmits its JOIN_REQUEST message, which defines the first reception window Rx1 and the second reception window Rx2, as already described in relation to FIG. 3A. The definition of the first reception window Rx1 and of the second reception window Rx2 enables the terminal EP to detect when said terminal EP no longer needs to rely on the relay RL 100 to communicate with the server equipment SERV 130, as detailed hereinafter in relation to FIGS. 6, 10 and 11. When said terminal EP transmits its JOIN_REQUEST message, this also defines a third reception window Rx'1 and a fourth reception window Rx'2. The third reception window Rx'1 is defined at a time $\Delta 4 \geq \Delta 1$ with respect to the first reception window Rx1, and the fourth reception window Rx'2 is defined at a time $\Delta 2$ with respect to the third reception window Rx'1. It should therefore be noted that the time $\Delta 4$ is typically greater than the time $\Delta 1$ because of the presence of the relay RL 100 in the transmission chain between the terminal EP in question and the server equipment SERV 130. The time $\Delta 4$ may however be equal to the time $\Delta 1$, in particular starting from the principle that the time $\Delta 1$ was defined with a comfortable margin in order to afford flexibility for the communication system in the operations to be performed in the context of the registration of a terminal EP.

The third reception window Rx'1 and the fourth reception window Rx'2 are preferentially of the same size. The third reception window Rx'1 may be of the same size as the first reception window Rx1, and the fourth reception window Rx'2 may be of the same size as the second reception window Rx2. In a preferential embodiment, the third reception window Rx'1 is enlarged by a margin with respect to the first reception window Rx1 and the fourth reception window Rx'2 is enlarged by a margin with respect to the first reception window Rx2, in order to relax the clock precision constraints, and in general terms the manufacturing constraints, of the relay RL 100 compared with those of the gateways GW.

In response to the JOIN_REQUEST message, the terminal EP is supposed to receive a JOIN_ACCEPT message in the third reception window Rx'1 or in the fourth reception window Rx'2, unless a gateway GW has come within radio range of said terminal EP, in which case the JOIN_ACCEPT message is transmitted in the first reception window Rx1 or in the second reception window Rx2. This arrangement enables the terminal EP to go on standby after having sent the JOIN_REQUEST message and to know exactly at what moment to wake up for receiving any response to the JOIN_REQUEST message when said terminal EP relies on the relay RL 100 to communicate with the server equipment SERV 130.

Because of the aforementioned possible margin ε, the definitions of the third reception window Rx'1 and the fourth reception window Rx'2 are respective replicas, offset in time (time $\Delta 4$), of the definitions of the first reception window Rx1 and of the second reception window Rx2. Preferentially, the same transmission configurations (modulation and coding scheme, etc.) are respectively used therein.

FIG. 3D illustrates schematically a sequencing of communications applied when a terminal EP wishes to transmit a service message MSG to the server equipment SERV 130 in reliance on the relay RL 100. When the terminal EP wishes to transmit such a service message MSG, said terminal EP accesses the communication medium in a predetermined timeslot, as described hereinafter in relation to FIG. 3E. Said terminal EP thus transmits its service message MSG, which defines the first reception window Rx1 and the second reception window Rx2, as well as the third reception window Rx'1 and the fourth reception window Rx'2. As with FIG. 3B, the first reception window Rx1 is defined at a time $\Delta 3 < \Delta 1$ with respect to the sending of the service message MSG, and as with FIG. 3C the third reception window Rx'1 is defined at a time $\Delta 5 \geq \Delta 3$ with respect to the first reception window Rx1. It should therefore be noted that the time $\Delta 5$ is typically greater than the time $\Delta 3$ because of the presence of the relay RL 100 in the transmission chain between the terminal EP in question and the server equipment SERV 130. The time $\Delta 5$ may however be equal to the time $\Delta 3$, in particular starting from the principle that the time $\Delta 3$ was defined with a comfortable margin in order to afford flexibility for the communication system in the operations to be performed in the context of the processing of the service messages MSG. The time $\Delta 5$ is preferentially equal to the time $\Delta 4$ and to the time $\Delta 1$, for reasons of simplicity of configuration of the communication system.

In response to the service message MSG, the terminal EP is supposed to receive a corresponding response message in the third reception window Rx'1 or in the fourth reception window Rx'2, unless a gateway GW has come within radio range of said terminal EP, in which case said response message is transmitted in the first reception window Rx1 or in the second reception window Rx2. This arrangement enables the terminal EP to go on standby after having sent the service message MSG and to know exactly at what moment to awake for receiving any response to the service message MSG when said terminal EP relies on the relay RL 100 to communicate with the server equipment SERV 130.

As with the times $\Delta 1$, $\Delta 2$ and $\Delta 3$, the times $\Delta 4$ and $\Delta 5$ are pre-indicated in any terminal EP that has awareness of the potential presence of the relay RL 100 in the communication system, as well as in the relay RL 100 (e.g. at the time of manufacture thereof). In a variant embodiment, the times $\Delta 4$ and $\Delta 5$ are pre-indicated in the relay RL 100 (e.g. at the time of manufacture thereof) and the relay RL 100 informs about values of the times $\Delta 4$ and/or $\Delta 5$ in the beacons transmitted by said relay RL 100. These beacons are introduced hereinafter in relation to FIG. 3E.

FIG. 3E illustrates schematically a sequencing of communications applied when a terminal EP wishes to rely on the relay RL 100 to communicate with the server equipment SERV 130. This is because the sequencings of communication illustrated in FIGS. 3A and 3B are initiated by a sending, asynchronously, respectively of a JOIN_REQUEST message or MSG by the terminal EP in question (or by the relay RL 100 when said relay RL 100 communicates with the server equipment SERV 130 via one or more gateways GW). The asynchronism of the initiation of these sequencings does not pose any particular difficulty since the gateways GW are designed so as to be powered permanently and can therefore be constantly ready to listen out on the medium in the context of the LPWAN communications. To enable the relay RL 100 to go on standby, a certain amount of synchronism is introduced. Thus the relay RL 100 regularly sends beacons B. These beacons B are sent at the same time as the beacons are sent by the gateways GW in the context of the LPWAN communications. This is because the gateways GW are synchronised with each other and are configured to simultaneously transmit beacons, which give a time reference to the equipment (e.g. terminals EP) that listen out to them. Thus, the relay RL 100 can rely on the beacons sent by one or more gateways GW to synchronise with the communication system. By itself sending the beacons B, the relay RL 100 also enables terminals EP outside effective radio range of the gateway GW to be synchronised with the rest of the communication system. The beacons B sent by the relay RL 100 include information indicating that said beacons B were sent by a relay RL so as to enable a terminal EP receiving said beacons to know that they have not been transmitted by a gateway GW. This enables said terminal EP to know which communication mode to use between Class A and Class A', as described below in relation to FIGS. 5 and 6.

The beacons B thus have the same format as those sent by the gateways GW. By relying on the LoRaWAN (registered trade mark) data transmission protocol, the beacons B can be distinguished from those sent by the gateways GW, by using a specific value (e.g. the value 3) in the Infodesc subfield of the GwSpecific field.

The time between two successive transmissions of beacons B, which is referred to as the cycle, is divided into timeslots SL separated by guard times of predefined duration, as shown in FIG. 3E, where x+1 timeslots from SL0 to SLx are shown. The timeslots SL are of predefined duration known to the terminals EP, the relay RL 100 and the gateways GW (e.g. at the time of manufacture thereof). The timeslots SL begin and end at deducible instants relative to the beacons B. Each beacon B includes information indicating which timeslots can be used by the terminals EP to rely on the relay RL 100 for communicating with the server equipment SERV 130. It is possible for a single timeslot SL to be enabled to be used per cycle by the terminals EP in order to rely on the relay RL 100 for communicating with the server equipment SERV 130. The timeslots SL indicated in the beacons B are therefore timeslots SL during which the relay RL 100 is configured to listen out on the medium, and therefore during which the JOIN_REQUEST messages and the service messages MSG that shall be relayed by the relay RL 100 shall be transmitted by the concerned terminals EP. This aspect is detailed hereinafter in relation to FIG. 7. The beacons B may further include information indicating what data rate DR is applicable in each timeslot SL indicated in said beacons B.

In a particular embodiment in which the relay RL 100 is not able to listen out on the medium at the same time as transmitting via said medium, the relay RL 100 cancels the transmission of a beacon B for certain cycles. This enables the relay RL 100 to listen out on the medium seeking a beacon sent by a gateway GW in the communication system, for determining the moment of sending thereof and to keep synchronised with the rest of the communication system.

The sequencings of communications shown in FIGS. 3C, 3D and 3E thus define the Class A' communication mode already mentioned. A different number of reception windows may be used, since the Class A' communication mode doubles (offset in time (times Δ4 and Δ5)) the number of reception windows used for the Class A communication mode.

Maintaining the existence of the first Rx1 and second Rx2 reception windows in the context of FIGS. 3C and 3D makes it possible to avoid signalling operations. This is because, if a terminal EP using the Class A' communication mode receives a response message in the first reception window Rx1 or in the second reception window Rx2, this means that said terminal EP is now within radio range of a gateway GW in the communication system. The terminal EP in question can then interpret the reception of said response message in the first reception window Rx1 or in the second reception window Rx2 as being an instruction from the server equipment SERV 130 to switch into Class A communication mode.

Figure 4:
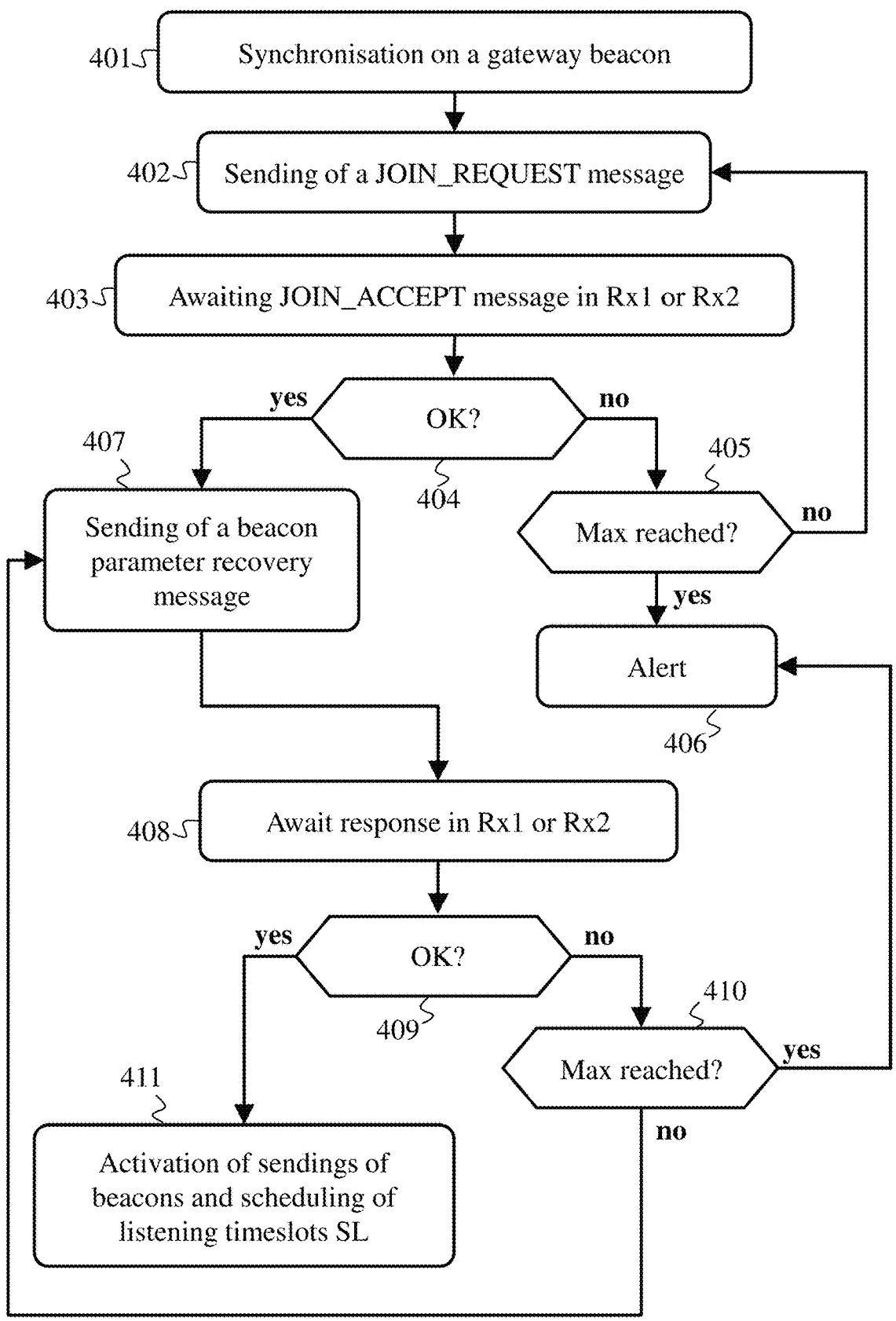
FIG. 4 illustrates schematically an algorithm, implemented by each relay, for initialising said relay.

FIG. 4 illustrates schematically an algorithm, implemented by each relay RL in the communication system, for initialising said relay RL. Let us consider by way of illustration that the algorithm in FIG. 4 is implemented by the relay RL 100.

In a step 401, the relay RL 100 listens out for beacons transmitted by one or more gateways GW. When the relay RL 100 receives such beacons, the relay RL 100 is capable of synchronising in the communication system. The relay RL 100 is then capable of determining the placement of the reception windows Rx1 and Rx2 that would follow a sending of a message by it intended for the server equipment SERV 130.

In a step 402, the relay RL 100 transmits a JOIN_REQUEST message to the server equipment SERV 130. The Class A transmission mode is used, as already described in relation to FIG. 3A. The relay RL 100 accesses the communication medium after having preferentially waited until a random period (bounded) has elapsed. This JOIN_REQUEST message is captured by at least one gateway GW the relay RL 100 of which receives beacons, and is propagated by this or these gateways GW toward the server equipment SERV 130. This JOIN_REQUEST message is processed by the server equipment SERV 130 as described below in relation to FIG. 8.

In a step 403, the relay RL 100 awaits a JOIN_ACCEPT message in the reception windows Rx1 and Rx2. Unless there is a predefined processing operation to be executed, the relay RL 100 waits until the occurrence of the first reception window Rx1 and, if no JOIN_ACCEPT message is sent thereto in the first reception window Rx1, the relay RL 100 goes on standby until the occurrence of the second reception window Rx2.

In a step 404, the relay RL 100 checks whether a JOIN_ACCEPT message has been sent thereto in the first reception window Rx1 or second reception window Rx2. If such is the case, a step 407 is performed. Otherwise a step 405 is performed.

In step 405, the relay RL 100 checks whether a maximum quota of sendings of JOIN_REQUEST messages has been reached without there having been a JOIN_ACCEPT message in response. If such is the case, a step 406 is performed. Otherwise step 402 is reiterated.

In step 406, an alarm is generated, so as to signify to an installer that the initialisation of the relay RL 100 has failed, and the algorithm in FIG. 4 is ended.

In step 407, the relay RL 100 sends a beacon parameter recovery message to the server equipment SERV 130. The Class A transmission mode is used, as already described in relation to FIG. 3B. The relay RL 100 accesses the communication medium after having preferentially waited until a random period (bounded) has elapsed. The parameters that the relay RL 100 seeks to obtain from the server equipment SERV 100 are intended to be used by the relay RL 100 to construct the beacons B mentioned in relation to FIG. 3E. These parameters could be predefined, e.g. by configuration by the installer or in the factory, in which case the relay RL 100 does not have to recover them from the server equipment SERV 130. This beacon parameter recovery message is processed by the server equipment SERV 130 as described below in relation to FIG. 8.

In a step 408, the relay RL 100 awaits a response message in the reception windows Rx1 and Rx2. Unless there is a predefined processing operation to be executed, the relay RL 100 goes on standby until the occurrence of the first reception window Rx1 and, if no response message is sent thereto in the first reception window Rx1, the relay RL 100 goes on standby until the occurrence of the second reception window Rx2.

In a step 409, the relay RL 100 checks whether a response message has been sent thereto in the first reception window Rx1 or second reception window Rx2. If such is the case, a step 411 is performed; otherwise a step 410 is performed.

In step 410, the relay RL 100 checks whether a maximum quota of sendings of beacon parameter recovery messages has been reached without there having been a response message in return. If such is the case, step 406 is performed; otherwise step 407 is reiterated.

In step 411, the relay RL 100 activates the regular sendings of the beacons B. The beacons B indicate that they are transmitted by a relay RL and furthermore identify, in accordance with the parameters recovered from the server equipment SERV 130, which timeslots SL can be used by any terminal EP in order to rely on the relay RL 111 so as to communicate with the server equipment SERV 130. The relay RL 100 also schedules wake-up periods corresponding to said timeslots SL during which the relay RL 100 listens out on the medium for capturing any message that the relay RL 100 would have to relay to the server equipment SERV 130. Other parameters may have been communicated by the server equipment SERV 130 in said response message, and the relay RL 100 uses them in the context of the scheduling of the regular sendings of the beacons B and/or the wake-up periods corresponding to said timeslots SL. The algorithm in FIG. 4 is next ended.

It is apparent from a reading of the algorithm in FIG. 4 and the sequencings of communications in FIGS. 3A and 3E that the relay RL 100 is a ready-to-use (plug and play) device. This is because it suffices to insert the relay RL 100 in the communication system already consisting of the server equipment SERV 130 and at least one gateway GW 120 within radio range of said relay RL 100 so that said relay RL 100 can take over the terminals EP and thus extend the radio range of the communication system.

Figure 5:
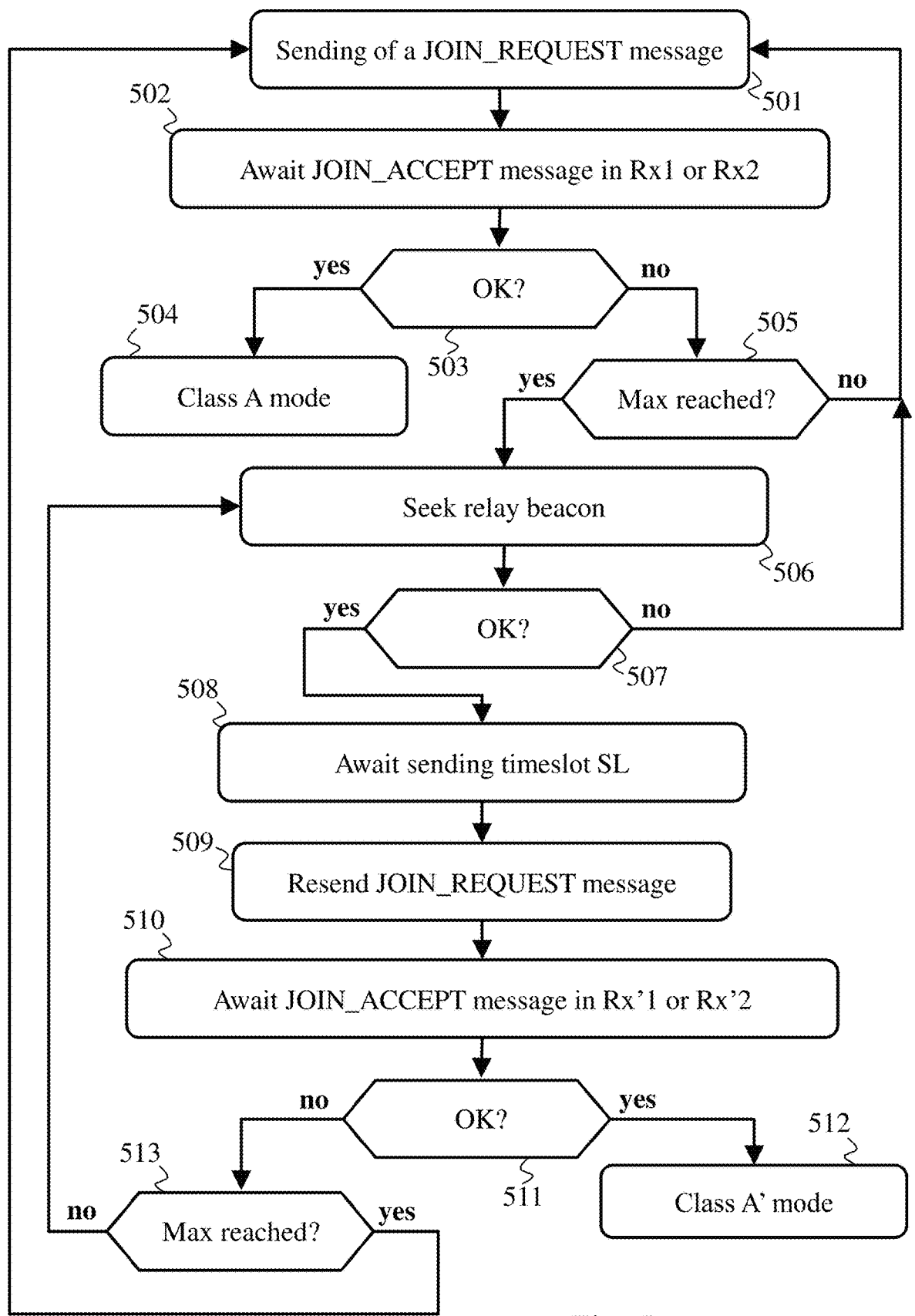
FIG. 5 illustrates schematically an algorithm, implemented by each terminal, for registering said terminal with the server equipment.

FIG. 5 illustrates schematically an algorithm, implemented by any terminal EP that is aware of the potential presence of at least one relay RL in the communication system, for executing a procedure for registering said terminal EP with the server equipment SERV 130. Let us consider by way of illustration that the algorithm in FIG. 5 is executed by the terminal EP 110.

In a step 501, the terminal EP 110 transmits a JOIN_REQUEST message to the server equipment SERV 130. By default, the Class A transmission mode is used, as already described in relation to FIG. 3A. The terminal EP 110 accesses the communication medium after having preferentially waited until a random period (bounded) has elapsed.

In a step 502, the terminal EP 110 awaits a JOIN_ACCEPT message in the reception windows Rx1 and Rx2. Unless there is a predefined processing operation to be executed, the terminal EP 110 goes on standby until the occurrence of the first reception window Rx1 and, if no JOIN_ACCEPT message is addressed thereto in the first reception window Rx1, the terminal EP 110 goes on standby until the occurrence of the second reception window Rx2.

In a step 503, the terminal EP 110 checks whether a JOIN_ACCEPT message was addressed thereto in the first reception window Rx1 or second reception window Rx2. If such is the case, this means that the terminal EP 110 is within radio range of at least one gateway GW, and a step 504 is performed; otherwise a step 505 is performed.

Figure 6:
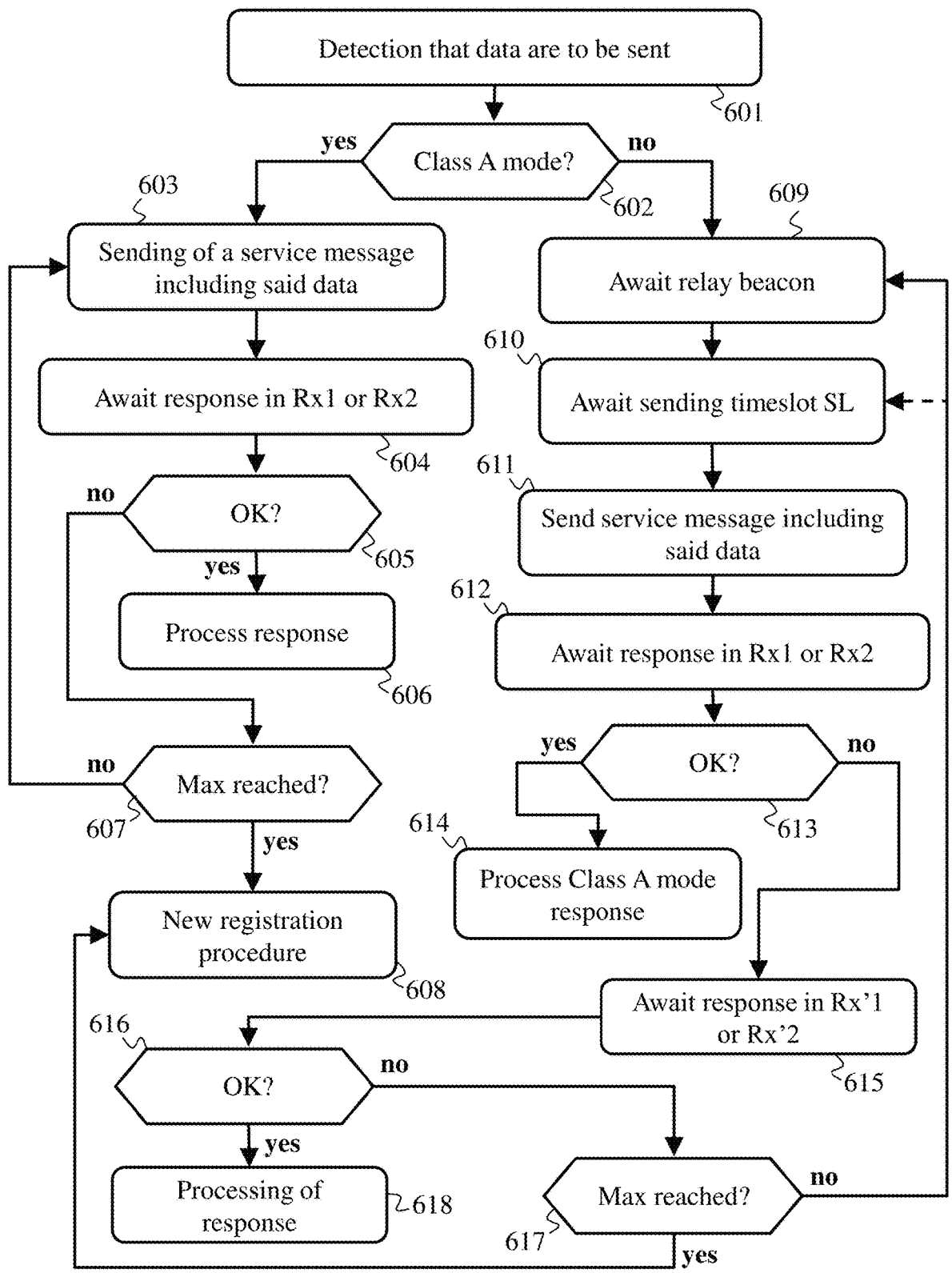
FIG. 6 illustrates schematically an algorithm, implemented by each terminal, for transmitting data to the server equipment.

In step 504, the terminal EP 110 processes the JOIN_ACCEPT message and configures itself to use the Class A transmission mode for the future communications, i.e. in the context of the algorithm in FIG. 6. The algorithm in FIG. 5 is then ended.

In step 505, the terminal EP 110 checks whether a maximum quota of sendings of JOIN_REQUEST messages, in Class A transmission mode, has been reached without there having been a JOIN_ACCEPT message in response. If such is the case, a step 506 is performed; otherwise step 501 is reiterated.

In step 506, the terminal EP 110 sets out to seek a beacon that would be sent by a relay RL, such as the relay RL 100. The terminal EP 110 listens out on the medium for a period at least equal to the duration of one cycle—i.e. the time between two successive beacons (128 seconds according to the LoRaWAN (registered trade mark) data transmission protocol).

In a step 507, the terminal EP 110 checks whether at least one beacon B has been detected by said terminal EP 110. As a reminder, the beacons B contain information indicating that said beacons have been sent by a relay RL rather than by a gateway GW. If such is the case, a step 508 is performed; otherwise step 501 is reiterated, after preferentially having waited until a predefined period has elapsed (during which the terminal EP 110 can go on standby).

In a step 508, the terminal EP 110 awaits the occurrence of a timeslot SL indicated, in the beacon received, as being enabled to transmit a message to the server equipment SERV 130 relying on the relay RL that sent said beacon. Unless there is a predefined processing operation to be executed, the terminal EP 110 goes on standby until the occurrence of said timeslot SL.

In step 509, the terminal EP 110 sends the JOIN_REQUEST message during said timeslot SL. The terminal EP 110 then uses the Class A' transmission mode.

In a step 510, the terminal EP 110 awaits a JOIN_ACCEPT message in the reception windows Rx1 and Rx2, and especially in the reception windows Rx'1 and Rx'2. This is because, at this stage, the reception windows Rx1 and Rx2 are dispensable since no gateway GW has a priori received the JOIN_REQUEST message transmitted at the previous execution of step 501. Unless there is a predefined processing operation to be executed, the terminal EP 110 goes on standby until the occurrence of the first reception window Rx1; if no JOIN_ACCEPT message is addressed thereto in the first reception window Rx1, the terminal EP 110 goes on standby until the occurrence of the second reception window Rx2. if no JOIN_ACCEPT message is addressed thereto in the second reception window Rx2, the terminal EP 110 goes on standby until the occurrence of the third reception window Rx'1; and if no JOIN_ACCEPT message is addressed thereto in the third reception window Rx'1, the terminal EP 110 goes on standby until the occurrence of the fourth reception window Rx'2.

In a step 511, the terminal EP 110 checks whether a JOIN_ACCEPT message was addressed thereto in the third reception window Rx'1 or fourth reception window Rx'2. It is considered here that no gateway GW is currently within radio range of the terminal EP 110, but, if the terminal EP 110 happens to receive a JOIN_ACCEPT message in the first reception window Rx1 or second reception window Rx2, then step 504 would be performed (not shown in FIG. 5). If a JOIN_ACCEPT message was addressed thereto in the third reception window Rx'1 or fourth reception window Rx'2, a step 512 is performed; otherwise a step 513 is performed.

In step 512, the terminal EP 110 processes the JOIN_ACCEPT message and configures itself to use the Class A' transmission mode for the future communications, i.e. in the context of the algorithm in FIG. 6. The algorithm in FIG. 5 is then ended.

In step 513, the terminal EP 110 checks whether a maximum quota of sendings of JOIN_REQUEST messages has been reached, in Class A' transmission mode, without there having been a JOIN_ACCEPT message in response. If such is the case, step 501 is reiterated; otherwise step 506 is reiterated.

FIG. 6 illustrates schematically an algorithm, implemented by any terminal EP that is aware of the potential presence of at least one relay RL in the communication system, for transmission of data to the server equipment SERV 130, after registration of said terminal EP with the server equipment SERV 130. Let us consider by way of illustration that the algorithm in FIG. 5 is executed by the terminal EP 110.

In a step 601, the terminal EP 110 detects that data held by said terminal EP 110 are to be transmitted to the server equipment SERV 130. For example, the terminal EP 110 includes a sensor (e.g. for water or gas consumption) and said data are measurement data collected by said sensor.

In a step 602, the terminal EP 110 determines whether said terminal EP 110 is configured in Class A transmission mode or whether said terminal EP 110 is configured in Class A' transmission mode. If the terminal EP 110 is configured in Class A transmission mode, a step 603 is performed; otherwise a step 609 is performed.

In step 603, the terminal EP 110 transmits, to the server equipment SERV 130, a service message MSG including said data. The Class A transmission mode is used, as already described in relation to FIG. 3B. The terminal EP 110 accesses the communication medium after having preferentially awaited until a random period (bounded) has elapsed.

In a step 604, the terminal EP 110 awaits a response message in the reception windows Rx1 and Rx2. Unless there is a predefined processing operation to be performed, the terminal EP 110 goes on standby until the occurrence of the first reception window Rx1 and, if no response message is addressed thereto in the first reception window Rx1, the terminal EP 110 goes on standby until the occurrence of the second reception window Rx2.

In a step 605, the terminal EP 110 checks whether a response message has been addressed thereto in the first reception window Rx1 or second reception window Rx2. If such is the case, a step 606 is performed; otherwise a step 607 is performed.

In step 606, the terminal P110 processes the response message, and the algorithm in FIG. 6 is then ended.

In step 607, the terminal EP 110 checks whether a maximum quota of sendings of the service message MSG has been reached without there having been a response message in return. If such is the case, a step 608 is performed; otherwise step 603 is reiterated.

In step 608, the terminal EP 110 performs a new registration procedure, i.e. once again executes the algorithm in FIG. 5. The algorithm in FIG. 6 is then ended.

In step 609, the terminal EP 110 awaits a beacon that would be sent by a relay RL and more particularly by the relay RL via which the terminal EP 110 registered with the server equipment SERV 130 (see the algorithm in FIG. 5). This enables the terminal EP 110 to check that it is still synchronised with the rest of the communication system, given that the terminal EP 110 may have remained on standby for many hours, which may have caused a certain offset in time between its internal clock and the actual broadcasting of the beacons in the communication system. However, if the internal clock of the terminal EP 110 is considered to be reliable, the terminal EP 110 can avoid performing step 609 at each execution of the algorithm in FIG. 6 and pass directly to a step 610.

In step 610, the terminal EP 110 awaits the occurrence of a timeslot SL indicated, in the beacon received, as being enabled to transmit a message to the server equipment SERV 110 relying on the relay RL that sent said beacon. Unless there is a predefined processing operation to be executed, the terminal EP 110 goes on standby until the occurrence of said timeslot SL.

In a step 611, the terminal EP 110 transmits, during said timeslot SL, to the server equipment SERV 130, a service message MSG including said data. The Class A' transmission mode is used, as already described in relation to FIGS. 3D and 3E.

In a step 612, the terminal EP 110 awaits a response message in the reception windows Rx1 and Rx2. Even if the terminal EP 110 is currently passing through a relay RL to communicate with the server equipment SERV 130, it is possible that the terminal EP 110 may now be within radio range of a gateway GW, in which case said gateway GW would also have propagated toward the server equipment SERV 130 the service message MSG directly received from the terminal EP 110. Unless there is a predefined processing operation to be executed, the terminal EP 110 goes on standby until the occurrence of the first reception window Rx1 and, if no response message is addressed thereto in the first reception window Rx1, the terminal EP 110 goes on standby until the occurrence of the second reception window Rx2.

In a step 613, the terminal EP 110 checks whether a response message has been addressed thereto in the first reception window Rx1 or in the second reception window Rx2. If such is the case, a step 614 is performed; otherwise a step 615 is performed.

In step 614, the terminal EP 110 processes the response message and configures itself to use the Class A transmission mode for the next communication to the server equipment SERV 130, i.e. in the context of the next execution of the algorithm in FIG. 6. Next the algorithm in FIG. 6 is ended.

In step 615, the terminal EP 110 awaits a response message in the reception windows Rx'1 and Rx'2. Unless there is a predefined processing operation to be executed, the terminal EP 110 goes on standby until the occurrence of the third reception window Rx'1 and, if no response message is addressed thereto in the third reception window Rx'1, the terminal EP 110 goes on standby until the occurrence of the fourth reception window Rx'2.

In a step 616, the terminal EP 110 checks whether a response message has been addressed thereto in the third reception window Rx'1 or fourth reception window Rx'2. If such is the case, a step 618 is performed; otherwise a step 617 is performed.

In step 617, the terminal EP 110 checks whether the maximum quota of sendings of the service message MSG has been reached without there having been a response message in return. If such is the case, step 608 is performed; otherwise step 609 is reiterated. The terminal EP 110 can also reattempt to send its service message MSG using another timeslot SL, in which the relay RL in question is supposed to listen out on the medium, in the same cycle—i.e. before the next broadcasting of beacons in the communication system. Step 610 is then directly executed.

In step 618, the terminal EP 110 processes the response message and the algorithm in FIG. 6 is then ended.

Figure 7:
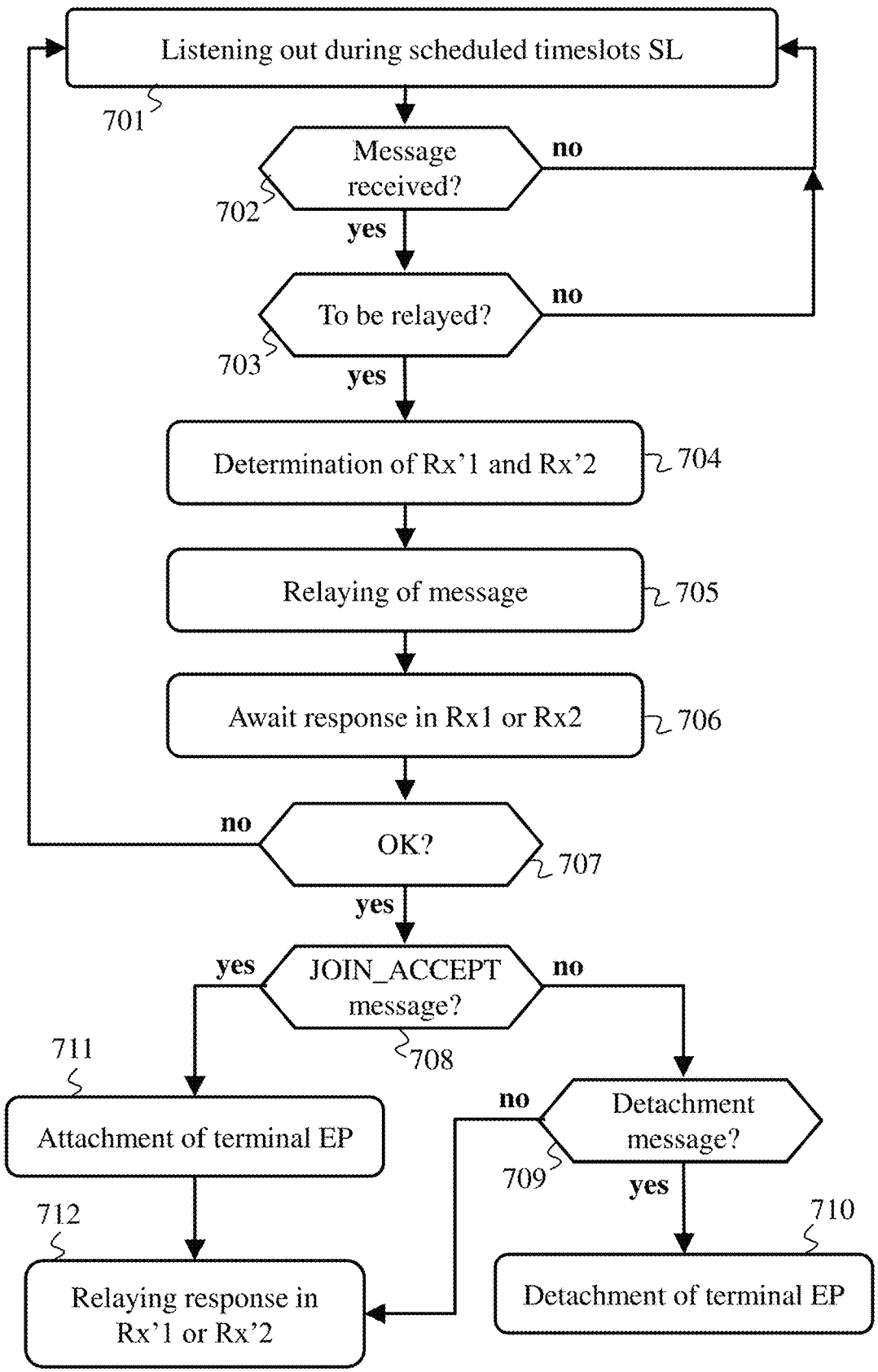
FIG. 7 illustrates schematically an algorithm, implemented by each relay, for propagating data toward the server equipment.

FIG. 7 illustrates schematically an algorithm, implemented by any relay RL, for propagating, toward the server equipment SERV 130, data received from a terminal EP. Let us consider by way of illustration that the algorithm in FIG. 7 is implemented by the relay RL 100.

In a step 701, the relay RL 100 listens out on the medium during the timeslots SL scheduled at step 411. These are the timeslots SL indicated in the beacons B sent cyclically by the relay RL 100.

In a step 702, the relay RL 100 checks whether a message coming from a terminal EP has been received during said timeslots SL. If such is the case, a step 703 is performed; otherwise step 701 is reiterated, going on standby as much as possible.

In step 703, the relay RL 100 checks whether the received message shall be relayed by the relay RL 100. If the received message is a JOIN_REQUEST message, said message shall be relayed by the relay RL 100 to the server equipment SERV 130, independently of the terminal EP that transmitted said message. If the received message is another message, said message shall be relayed by the relay RL 100 to the server equipment SERV 130 only if said message was sent by a terminal EP that the relay RL 100 is in charge of, that is to say if the terminal EP is entered in an identification list L of the terminals EP that are attached thereto, that is to say the service messages of which are to be relayed by the relay RL 100 (see a step 711 described below). If the received message shall be relayed by the relay RL 100, a step 704 is performed; otherwise step 701 is reiterated, going on standby as much as possible.

In step 704, the relay RL 100 determines at which instants the third Rx'1 and fourth Rx'2 reception windows are defined, as from the reception of said message. The relay RL 100 therefore determines in which time windows said relay RL 100 has the possibility of responding to the received message.

In a step 705, the relay RL 100 relays the received message, toward the server equipment SERV 130. To do this, the relay RL 100 encapsulates the received message in a service message that the relay RL 100 sends in its name to the server equipment SERV 130. The relay RL 100 being seen as a terminal EP from the point of view of the gateways GW, this encapsulation makes it possible to make the presence of the relay RL 100 transparent vis-à-vis the gateways GW. The relay RL 100 uses the Class A transmission mode, since the gateways GW permanently listen out on the medium. This service message sent by the relay RL 100 is processed by the server equipment SERV 130 as described below in relation to FIGS. 9 and 10. In a particular embodiment, this service message includes information on signal quality level in reception of said message, more particularly with regard to the JOIN_REQUEST messages. This may assist the server equipment SERV 130 to decide to which relay RL the responsibility for the terminal EP in question should be entrusted when one and the same JOIN_REQUEST message is relayed by a plurality of relays RL (which supposes that said relays RL indicate at least one timeslot SL in common in their respective beacons) on behalf of said terminal EP.

In a step 706, the relay RL 100 awaits a response message in the reception windows Rx1 and Rx2, as described in relation to FIG. 3B. Unless there is a predefined processing operation to be executed, the relay RL 100 goes on standby until the occurrence of the first reception window Rx1 and, if no response message is addressed thereto in the first reception window Rx1, the relay RL 100 goes on standby until the occurrence of the second reception window Rx2. It should be noted that here the first Rx1 and second Rx2 reception windows are defined with respect to the service message sent by the relay RL 100 to the server equipment SERV 130, and that there must be no confusion with the first Rx1 and second Rx2 reception windows defined with respect to the message originally sent by the terminal EP (and which the relay RL 100 relays in its service message).

In a step 707, the relay RL 100 checks whether a response message has been addressed thereto in the first reception window RX1 or second reception window Rx2. If such is the case, a step 708 is performed; otherwise this means that the terminal EP in question will a priori have no response to the message that said terminal EP had sent and that the relay RL 100 had relayed, and step 701 is reiterated, going on standby as much as possible.

In a step 708, the relay RL 100 de-encapsulates the received response message and checks whether the received response message encapsulates a JOIN_ACCEPT message (preferentially further checking that the JOIN_ACCEPT message does indeed correspond to a JOIN_REQUEST message previously relayed). If such is the case, a step 711 is performed; otherwise a step 709 is performed.

In step 709, the relay RL 100 checks whether the received response message is a detachment message DETACH. A detachment message is a message that instructs the relay RL 100 to no longer relay the service messages coming from the terminal EP in question. This case arises when said terminal EP is now within radio range of one or more gateways GW, as described below in relation to FIG. 10. If the received response message is a detachment message DETACH, a step 710 is performed; otherwise a step 712 is performed.

In step 710, the relay RL 100 deletes the terminal EP (its identifier DevAddr that was allocated thereto by the server equipment SERV 100) from the list L identifying the terminals EP that are attached thereto. The algorithm in FIG. 7 is next ended.

In step 711, the relay RL 100 registers, in a local memory, an identifier DevAddr of the terminal EP contained in the JOIN_ACCEPT message. This identifier DevAddr of the terminal EP is allocated by the server equipment SERV 130 following the reception of the JOIN_REQUEST message that is followed by said JOIN_ACCEPT message. This identifier DevAddr of the terminal EP enhances the list L identifying the terminals EP that are attached thereto. The relay RL 100 therefore interprets the reception of this JOIN_ACCEPT message as being an implicit instruction for attachment of said terminal EP to the relay RL 100. Variants to this approach are described below in relation to a step 906. Step 712 is next performed.

In step 712, the relay RL 100 propagates the JOIN_ACCEPT message in the third reception window Rx'1 or in the fourth reception window Rx'2 defined by execution of step 704, namely the third Rx'1 and fourth Rx'2 reception windows defined by the sending of the original message by the terminal EP in question. Next the algorithm in FIG. 7 is ended.

Figure 8:
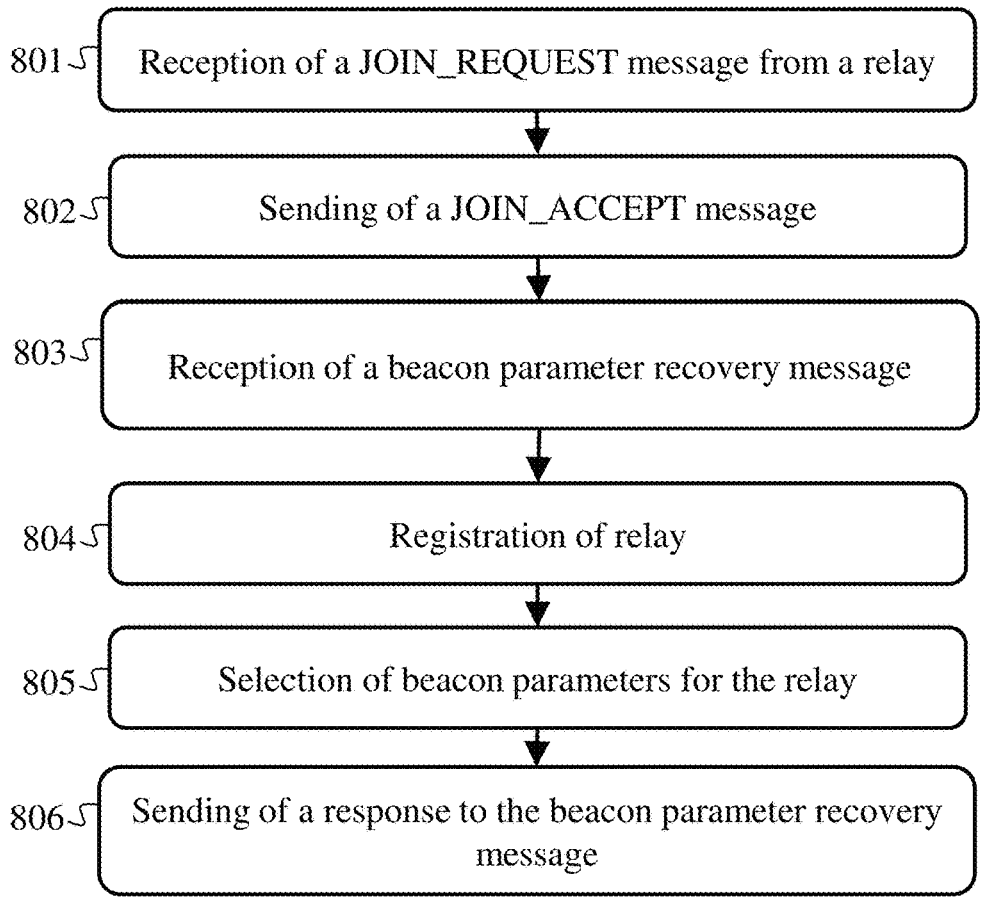
FIG. 8 illustrates schematically an algorithm, implemented by the server equipment, for registering each relay when said relay is initialised.

FIG. 8 illustrates schematically an algorithm, implemented by the server equipment SERV 130, for registering any relay RL in the communication system (in accordance with FIG. 4). The algorithm in FIG. 8 is preferentially executed by the LNS server 131.

In a step 801, the server equipment SERV 130 receives a JOIN_REQUEST message coming from a relay RL, such as the relay RL 100. Unless the server equipment SERV 100 has knowledge of the unique identifiers EUI (extended unique identifier) of all the relays RL liable to be included in the communication system, the server equipment SERV 130 does not yet know that the JOIN_REQUEST message is coming from a relay RL.

In a step 802, the server equipment SERV 130 processes the JOIN_REQUEST message and allocates an identifier DevAddr to the relay RL in question. The server equipment SERV 130 sends, in response to the JOIN_REQUEST message, a JOIN_ACCEPT message including the identifier DevAddr allocated to the relay RL in question. The server equipment SERV 130 selects a gateway GW from those (if there are several of them) that propagated the JOIN_RE-QUEST message thereto. Typically, the server equipment SERV 130 selects a gateway GW that has indicated the best signal quality level in reception of said JOIN_REQUEST message. The gateway GW thus selected is therefore responsible for responding to the relay RL in question, using the first Rx1 or second Rx2 reception window, which were defined by the sending of the JOIN_REQUEST message by the relay RL in question (in accordance with FIG. 3A).

If the server equipment SERV 130 receives a JOIN_RE-QUEST message for a relay RL already registered, the server equipment SERV 130 cancels the previous registration of said relay RL (this means that said relay RL had lost the connection to the communication system and has initiated a new registration procedure).

In a step 803, the server equipment SERV 130 receives a service message MSG from the relay RL in question. This service message is a message for recovering beacon parameters (as already mentioned in relation to FIG. 4). The server equipment SERV 130 then knows that it is dealing with a relay RL.

In a step 804, the server equipment SERV 130 registers the unique identifier EUI of the relay RL in question, the identifier DevAddr that was allocated thereto, and indicates accordingly that the device concerned is a relay RL.

In the aforementioned particular embodiment of the server equipment SERV 130, the LNS server 131 informs the relay application RLA 132, responsible for said relay RL, of the presence of said relay RL in the communication system. Said relay application RLA 132 is then able to perform encapsulations and de-encapsulations to enable said relay RL to fulfil its role of relay. In the case where a plurality of relay applications RLA 132 exist in the server equipment SERV 130, the LNS server 131 keeps track of information indicating with which relay application RLA 132 said relay RL was declared.

In a step 805, the server equipment SERV 130 determines which timeslots SL shall be used by the relay RL in question to receive messages coming from any terminals EP that may be attached thereto subsequently. These are the timeslots SL that the relay RL in question shall mention in the beacons B (see step 411). The server equipment SERV 130 chooses these timeslots SL in the same way as for the communications in Class B transmission mode implemented by the gateways GW in the context of the LoRaWAN (registered trade mark) data transmission protocol. Other parameters may be selected by the server equipment SERV 130 for the sending of the beacons B by the relay RL in question, such as for example the times Δ4 and Δ5 mentioned in relation to FIGS. 3C and 3D.

In a step 806, the server equipment SERV 130 sends, to the relay RL in question, a response message including the parameters determined at step 805, particularly information representing said timeslots SL. The server equipment SERV 130 uses a gateway GW for propagating said response message toward the relay RL in question. Said gateway GW then uses the first reception window Rx1 or the second reception window Rx2 that were defined by the sending, by said relay RL, of said beacon parameter recovery message (in accordance with FIG. 3B). The algorithm in FIG. 8 is then ended.

Figure 9:
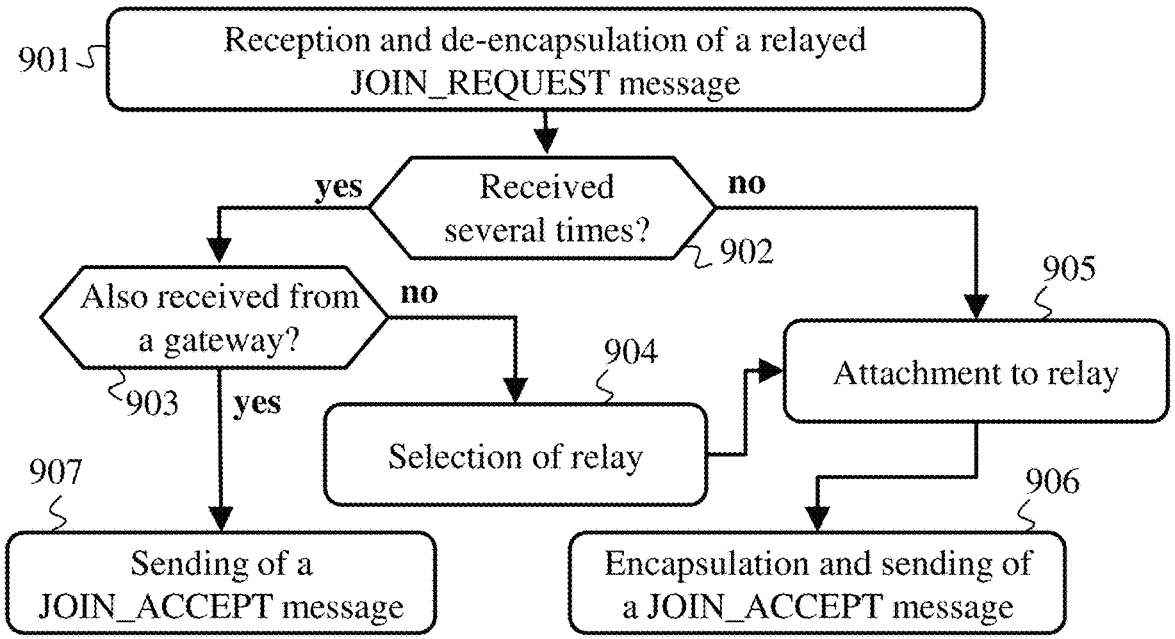
FIG. 9 illustrates schematically an algorithm, implemented by the server equipment, for processing a first type of relayed message.

FIG. 9 illustrates schematically an algorithm, implemented by the server equipment SERV 130, for processing a JOIN_REQUEST message relayed by a relay RL of the communication system.

In a step 901, the server equipment SERV 130 receives the JOIN_REQUEST message relayed by a relay RL of the communication system. Said JOIN_REQUEST message was therefore encapsulated in a service message MSG by said relay RL. The server equipment SERV 130 then de-encapsulates said JOIN_REQUEST message.

In the aforementioned particular embodiment of the server equipment SERV 130, the service message MSG is received by the LNS server 131, which detects that the message is coming from said relay RL by virtue of the identifier, included in said service message MSG, which corresponds to the identifier allocated to said relay RL. The LNS server 131 therefore passes said service message MSG to the relay application RLA 132 responsible for said relay RL. Said relay application RLA 132 de-encapsulates said JOIN_REQUEST message on behalf of the LNS server 131.

In a step 902, the server equipment SERV 130 checks whether said JOIN_REQUEST message has been received several times, i.e. by several means. This means that the server equipment SERV 130 subjects the processing of said JOIN_REQUEST message to a time delay so as to be able to determine, according to the maximum latency in the communication system, whether said JOIN_REQUEST message is actually received or not by another means. If such is the case, a step 903 is performed; otherwise a step 905 is performed.

In step 903, the server equipment SERV 130 checks whether said JOIN_REQUEST message has also been received by another gateway GW. If such is the case, a step 907 is performed; otherwise a step 904 is performed.

In step 904, the server equipment SERV 130 selects a relay RL from those that relayed said JOIN_REQUEST message. For example, each relay RL includes, in its service message MSG used to encapsulate said JOIN_REQUEST message, signal quality level information in reception of said JOIN_REQUEST message. The server equipment SERV 130 then selects the relay RL having the best signal quality level in reception of said JOIN_REQUEST message. According to another example, the server equipment SERV 130 selects the relay RL to which the smallest number of terminals EP are attached among those that relayed said JOIN_REQUEST message. Other criteria may be used, alone or in combination with the aforementioned examples. Then step 905 is performed.

In step 905, the server equipment SERV 130 allocates an identifier DevAddr to the terminal EP that transmitted said JOIN_REQUEST message and registers the fact that said terminal EP is attached to said relay RL. The server equipment SERV 130 therefore, for each relay RL, maintains a list L' of the terminals EP that are attached to said relay RL, said terminals EP being respectively identified by their unique identifier EUI and by their identifier DevAddr. If the server equipment SERV 130 receives a JOIN_REQUEST message for a terminal EP already attached to a relay RL, the server equipment SERV 130 cancels the previous registration of said terminal EP (this means that said terminal EP had lost the connection to the communication system and has initiated a new registration procedure).

In step 906, the server equipment SERV 130 generates a JOIN_ACCEPT message intended for the terminal EP that transmitted said JOIN_REQUEST message, the JOIN_ACCEPT message including the identifier DevAddr allocated to said terminal EP. In addition, the server equipment SERV 130 encapsulates said JOIN_ACCEPT message in a message of response to the service message MSG via which said JOIN_REQUEST message reached the server equipment SERV 130. This response is addressed to the relay RL to which the terminal EP in question is attached. The server equipment SERV 130 uses a gateway GW for propagating, toward said relay RL, said message of response to the service message MSG. Said gateway GW then uses the first reception window Rx1 or the second reception window Rx2 that have been identified by the sending, by said relay RL, of said service message MSG (in accordance with FIG. 3B). The algorithm in FIG. 9 is then ended.

In the aforementioned particular embodiment of the server equipment SERV 130, the LNS server 131 passes said JOIN_ACCEPT message to the relay application RLA 132 responsible for said relay RL. Said relay application RLA 132 encapsulates said JOIN_ACCEPT message on behalf of the LNS server 131.

It is considered in the description of step 906 hereinabove that said relay RL interprets the reception of said response message encapsulating the JOIN_ACCEPT message intended for said terminal EP as being an instruction for attachment of said terminal EP to said relay RL. In a variant, the server equipment SERV 130 can include, in said response message encapsulating the JOIN_ACCEPT message, information indicating explicitly to said relay RL that said terminal EP is now attached to said relay RL. Another variant consists of said relay RL transmitting another service message MSG in response to the reception of said JOIN_ACCEPT message encapsulated. This other service message MSG is therefore a message requesting confirmation of attachment, and includes the identifier DevAddr of said terminal EP, so that the server equipment SERV 130 knows to which terminal EP the relay RL in question refers. The server equipment SERV 130 then responds to said other service message MSG by confirming, or if applicable denying, the attachment of said terminal EP to said relay RL. Yet another variant is that, following the reception of said encapsulated JOIN_ACCEPT message, said relay RL regularly transmits to the server equipment SERV 130 such an attachment confirmation message. In the same way, the server equipment SERV 130 then responds to said other service message MSG by confirming, or denying, the attachment of said terminal EP to said relay RL. This makes it possible to ensure that the server equipment SERV 130 and said relay RL are in agreement on the fact that the terminal EP in question is, or is not, attached to said relay RL. If the server equipment SERV 130 denies the attachment of said terminal EP or does not respond, the relay RL in question considers that it no longer has to relay the service messages MSG coming from said terminal EP and deletes it from the list L identifying the terminals EP that are attached thereto.

In step 907, the server equipment SERV 130 generates a JOIN_ACCEPT message intended for the terminal EP that transmitted said JOIN_REQUEST message, the JOIN_ACCEPT message including the identifier DevAddr allocated to said terminal EP. The server equipment SERV 130 uses a gateway GW for propagating, toward the terminal EP in question, said JOIN_ACCEPT message. Said gateway GW then uses the first reception window Rx1 or the second reception window Rx2 that have been identified by the sending, by said terminal EP, of said JOIN_REQUEST message (in accordance with FIG. 3A). The algorithm in FIG. 9 is then ended.

Figure 10:
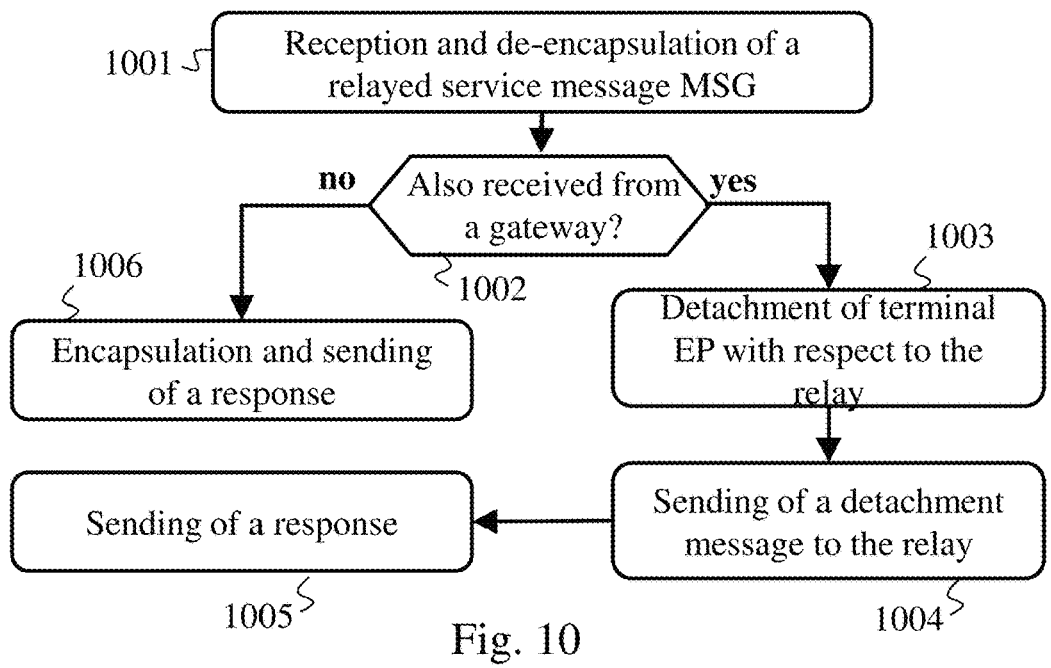
FIG. 10 illustrates schematically an algorithm, implemented by the server equipment, for processing a second type of relayed message.

FIG. 10 illustrates schematically an algorithm, implemented by the server equipment SERV 130, for processing a service message MSG transmitted by a terminal EP and relayed by a relay RL of the communication system.

In a step 1001, the server equipment SERV 130 receives the service message MSG transmitted by the terminal EP and relayed by said relay RL. Said service message MSG has therefore itself been encapsulated in another service message MSG by said relay RL. The server equipment SERV 130 then de-encapsulates said service message MSG transmitted by a terminal EP.

In the aforementioned particular embodiment of the server equipment SERV 130, said other service message MSG is received by the LNS server 131, which detects that the message comes from said relay RL by means of the identifier, included in said other service message MSG, which corresponds to the identifier allocated to said relay RL. The LNS server 131 therefore passes said other service message MSG to the relay application RLA 132 responsible for said relay RL. Said relay application RLA 132 then de-encapsulates said service message MSG transmitted by a terminal EP, on behalf of the LNS server 131.

In a step 1002, the server equipment SERV 130 checks whether said service message MSG transmitted by a terminal EP has also been received via a least one gateway GW. If such is the case, this means that the terminal EP is now within radio range of at least one gateway GW of the communication system, and a step 1003 is performed; otherwise a step 1006 is performed.

In step 1003, the server equipment SERV 130 detaches the terminal EP from said relay RL. In other words, the server equipment SERV 130 deletes the unique identifier EUI and the identifier DevAddr of the terminal EP in question from the list L' of the terminals EP attached to said relay RL.

In a step 1004, the server equipment SERV 130 generates a message of detachment of said terminal EP, which is intended for the relay RL. This message is sent to the relay RL in response to said other service message MSG in which the service message MSG originally transmitted by said terminal EP was encapsulated. The server equipment SERV 130 uses a gateway GW for propagating said detachment message toward said relay RL. Said gateway GW then uses the first reception window Rx1 or the second reception window Rx2 that were defined by the sending, by said relay RL, of said other service message MSG (in accordance with FIG. 3B). The relay RL will therefore stop propagating the service messages MSG coming from the terminal EP in question (see step 710).

In a step 1005, the server equipment SERV 130 processes the service message MSG transmitted by said terminal EP and transmits a response message to said terminal EP (and therefore without passing through said relay RL). The server equipment SERV 130 uses a gateway GW for propagating, toward the terminal EP in question, said response message. Said gateway GW then uses the first reception window Rx1 or the second reception window Rx2 which were defined by the sending, by said terminal EP, of said response message (in accordance with FIG. 3B). The algorithm in FIG. 10 is then ended.

In step 1006, the server equipment SERV 130 processes the service message MSG transmitted by said terminal EP and generates a response message intended for said terminal EP. In addition, the server equipment SERV 130 encapsulates said response message in another response message aimed at responding to said aforementioned other service message MSG. This other response message is therefore addressed to the relay RL to which the terminal EP in question is attached. The server equipment SERV 130 uses a gateway GW for propagating, toward said relay RL, said other response message. Said gateway GW then uses the first reception window Rx1 or the second reception window Rx2 which were defined by the sending, by said relay RL, of said other service message MSG (in accordance with FIG. 3B). The algorithm in FIG. 10 is then ended.

In the aforementioned particular embodiment of the server equipment SERV 130, at step 1006 the LNS server 131 propagates the service message MSG, transmitted by the terminal EP in question, toward the terminal application EPA 133 responsible for said terminal EP, so that said service message MSG is processed by said terminal application EPA 133. Said terminal application EPA 133 then generates said response message and passes it to the LNS server 131 for sending. The LNS server 131 realises that the terminal EP in question is attached to said relay RL. The LNS server 131 then passes said response message, for encapsulation of said response message, to the relay application RLA 132 responsible for said relay RL.

Figure 11:
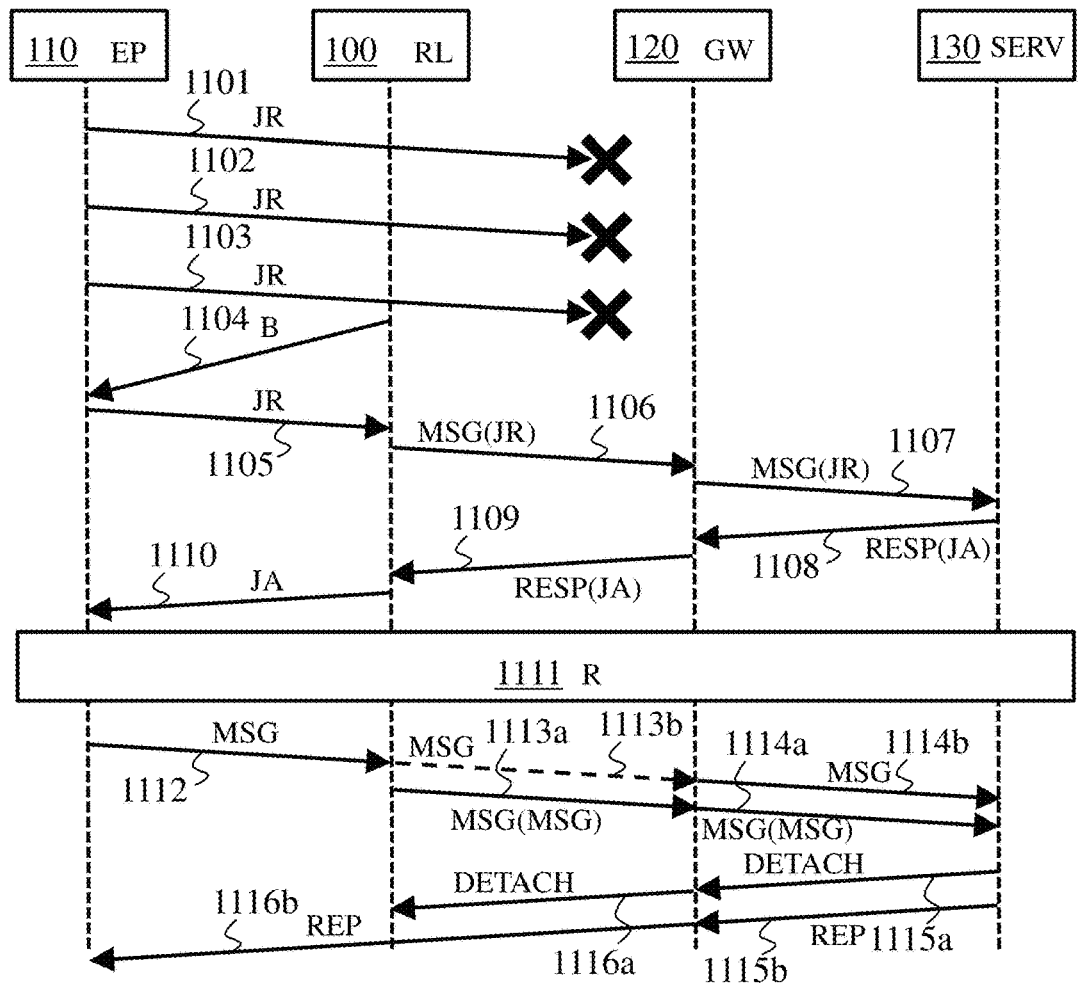
FIG. 11 illustrates schematically an example of exchanges of messages in the communication system, in application of an embodiment of the present invention.

FIG. 11 illustrates schematically an example of message exchanges in the communication system, in application of an embodiment of the present invention.

Let us consider that the terminal EP 110 seeks to register in the communication system comprising the relay RL 100, the gateway GW 120 and the server equipment SERV 130. The relay RL is already registered with the server equipment SERV 130 and is within radio range of the gateway GW 120. The terminal EP 110 is on the other hand not within radio range of the gateway GW 120, nor of any other gateway GW of the communication system.

In a step 1101, the terminal EP 110 transmits a JOIN_REQUEST (JR) message to the server equipment SERV 130. The terminal EP 110 uses the Class A communication mode, hoping that its JOIN_REQUEST message will be received by at least one gateway GW. The terminal EP 110 does not obtain feedback from the gateway GW, neither in the first reception window Rx1 nor in the second reception window Rx2 (defined with respect to the sending of the JOIN_REQUEST message at step 1101).

In a step 1102, the terminal EP 110 reiterates the transmission of the JOIN_REQUEST (JR) message to the server equipment SERV 130. The terminal EP 110 again uses the Class A communication mode. The terminal EP 110 does not obtain feedback from the gateway GW, neither in the first reception window Rx1 nor in the second reception window Rx2 (defined with respect to the sending of the JOIN_REQUEST message at step 1102).

In a step 1103, the terminal EP 110 reiterates the transmission of the JOIN_REQUEST (JR) message to the server equipment SERV 130. The terminal EP 110 again uses the Class A communication mode. The terminal EP 110 does not obtain feedback from a gateway GW, neither in the first reception window Rx1 nor in the second reception window Rx2 (defined with respect to the sending of the JOIN_REQUEST message at step 1102). The terminal EP 110 then considers that it has reached the maximum quota of unsuccessful transmissions of its JOIN_REQUEST (JR) message, the terminal EP 110 decides to switch into Class A' communication mode.

In a step 1104, the terminal EP 110 receives a beacon B transmitted by the relay RL 100. The beacon specifies the timeslots SL, defined with respect to the sending of said beacon B, during which the relay RL 100 listens out on the medium.

In a step 1105, the terminal EP 110 waits for the occurrence of one of said timeslots SL and reiterates the transmission of the JOIN_REQUEST (JR) message to the server equipment SERV 130. The JOIN_REQUEST (JR) message is received by the relay RL 100.

In a step 1106, the relay RL 100 transmits, to the server equipment SERV 130, a service message MSG(JR) encapsulating the JOIN_REQUEST (JR) message transmitted by the terminal EP 110 at step 1105. This service message MSG(JR) is received by the gateway GW 120, which propagates it toward the server equipment SERV 130 in a step 1107. The server equipment SERV 130 obtains, by de-encapsulation, the JOIN_REQUEST (JR) message transmitted by the terminal EP 110 and processes it. The terminal EP 110 is then registered in the communication system.

In a step 1108, the server equipment SERV 130 transmits a message REP(JA) of response to the service message sent by the relay RL 100 at step 1106. The server equipment SERV 130 applies to the gateway GW 120 to propagate said response message REP(JA), which encapsulates a JOIN_ACCEPT (JA) message to be sent to the terminal EP 110.

In a step 1109, the gateway GW 120 propagates the response message REP(JA) toward the relay RL 100, which receives said response message REP(JA). The gateway GW 120 uses the first reception window Rx1 or the second reception window Rx2, defined with respect to the sending of the service message MSG(JR) by the relay RL 100 at step 1106. The relay RL 100 obtains, by de-encapsulation, the JOIN_ACCEPT (JA) message to be sent to the terminal EP 110 and transmits it in a step 1110. The relay RL 100 notes that the terminal EP 110 is now attached to said relay RL 100. The terminal EP 110 receives the JOIN_ACCEPT (JA) message and knows that it is registered in the communication system. The terminal EP 110 is now enabled to transmit service messages MSG, which are then relayed by the relay RL 100, and the responses to which are also relayed by the relay RL 100 (provided that the terminal EP 100 complies with the timeslot SL constraints imposed by the Class A' communication mode).

Thus, in a relay phase R 1111, service messages MSG sent by the terminal EP 110 to the server equipment SERV 100 are relayed. In addition, during this relay phase R 1111, the relay RL 100 relays response messages that the server equipment SERV 130 wishes to transmit to the terminal EP 110 in response to said service messages MSG. The relay RL 100 uses, to do this, the third reception window Rx'1 or the second reception window Rx'2, defined with respect to the sending of the service message MSG that was sent by the terminal EP 110 and to which the response message in question refers. We shall consider that, at the end of this relay phase R 1111, the gateway GW 120 becomes within radio range of the terminal EP 110, for example because the terminal EP 110 has moved.

In a step 1112, the terminal EP 110 transmits a service message MSG to the server equipment SERV 130, awaiting the occurrence of one of said timeslots SL specified in the beacons B sent by the relay RL 100. This service message MSG is received by the relay RL 100.

In a step 1113a, the relay RL 100 transmits, to the server equipment SERV 130, another service message MSG(MSG) encapsulating the service message MSG transmitted by the terminal EP 110 at step 1112. This other service message MSG(MSG) is received by the gateway GW 120, which propagates it toward the server equipment SERV 130 in a step 1114a. The server equipment SERV 130 obtains, by de-encapsulation, the service message MSG transmitted by the terminal EP 110.

In parallel, the service message MSG has also been received by the gateway GW 120 in a step 1113b. The gateway GW 120 propagates it toward the server equipment SERV 130 in a step 1114b. The server equipment SERV 130 then obtains another copy of the service message MSG transmitted by the terminal EP 110. The server equipment SERV 130 therefore notes that it has received this service message MSG not only via the relay RL 100 as expected (since the terminal EP 110 is attached to the relay RL 100), but also by direct reception from the gateway GW 120.

In a step 1115a, the server equipment SERV 130 sends to the relay RL 100, in response to said other service message MSG(MSG), a detachment message DETACH by means of which the server equipment SERV 130 instructs the relay RL 100 that the terminal EP 110 is no longer attached thereto. The server equipment SERV 130 addresses the gateway GW 120 for propagating said detachment message DETACH.

In a step 1116a, the gateway GW 120 propagates the detachment message DETACH toward the relay RL 100. The gateway GW 120 uses the first reception window Rx1 or the second reception window Rx2, defined with respect to the sending of said other service message MSG(MSG) by the relay RL 100 at step 1113a. The relay RL 100 receives said detachment message DETACH and notes that the terminal EP 110 is now no longer attached to said relay RL 100. The relay RL 100 now no longer relays the service messages MSG transmitted by the terminal EP 110 (for the coincidences where the terminal EP 110 sends such a service message MSG exactly during an occurrence of a timeslot SL among those specified in the beacons B sent by the relay RL 100, which is highly improbable).

In a step 1115b, the server equipment SERV 130 sends to the terminal EP 110, in response to said service message MSG transmitted by the terminal EP 110, a response message REP. The server equipment SERV 130 addresses the gateway GW 120 for propagating said response message REP to the terminal EP 110.

In a step 1116b, the gateway GW 120 propagates the response message REP toward the terminal EP 110. The terminal EP 110 receives said response message REP and notes that said response message REP has been transmitted in the first reception window Rx1 or in the second reception window Rx2, with respect to the sending of the service message MSG at step 1112. The terminal EP concludes therefrom that it is now within radio range of a gateway GW of the communication system, and switches into Class A communication mode.

The invention claimed is:

1. A method for transmission in a communication system including server equipment and a gateway connected to the server equipment, each gateway being configured to communicate with a terminal via an LPWAN communication network using a so-called Class A communication mode defined as follows:
said gateway receives an original message coming from one said terminal and propagates said received original message toward the server equipment, wherein the original message comprises a registration message from said terminal to the server equipment or another message from said terminal to the server equipment, wherein the original message comprises a registration message from said terminal to the server equipment or another message from said terminal to the server equipment;

on reception of a response message from the server equipment, said gateway propagates the response message toward said terminal using at least one reception window defined with respect to a transmission time of said original message by said terminal;
wherein the communication system further includes a relay seen as a terminal by each gateway, each relay using the Class A communication mode for communicating with one or more of said gateways, and using, to communicate with one or more terminals, another communication mode, referred to as Class A', defined as follows:
the relay transmits beacons at regular intervals, each beacon including information representing at least one timeslot predefined with respect to said beacon;
the relay listens out for any original messages sent by one or more terminals, toward the server equipment, only during each said timeslot;
in the case of a response message from the server equipment provided via one said gateway in Class A communication mode, said relay propagates the response message toward said terminal using at least one other reception window defined with respect to a transmission time of said original message by said terminal, each said other reception window being offset subsequently by a predefined time with respect to each reception window defined in Class A communication mode; and
wherein, on reception by one said relay of an original message sent by one said terminal in Class A' communication mode, said relay performs:
performing an encapsulation of the original message in another message intended for the server equipment;
transmitting said other message in Class A communication mode so that said gateway propagates said other message toward the server equipment;
in the case of a response message from the server equipment provided via one said gateway using a reception window defined in Class A communication mode with respect to the transmission of said other message by said relay, performing a de-encapsulation of another response message contained in said response message and propagating said other response message toward said terminal in one said other reception window defined in Class A' communication mode with respect to the transmission of said original message by said terminal; and
wherein, on reception of a message propagated by one or more gateways, when the received message includes a message relayed by one said relay, the server equipment performs:
performing a de-encapsulation of the relayed message;
processing the relayed message for obtaining a response message to be addressed to the terminal that sent the message that was relayed;
performing an encapsulation of the response message in another response message to be addressed to the relay; and
transmitting said other response message to a gateway so that said gateway propagates said other response message toward said relay in one said reception window defined in Class A communication mode with respect to the transmission by said terminal of said propagated message.

2. The method according to claim 1, wherein each relay is initialised as follows:

said relay transmits a registration message to the server equipment;

in the case of a response message from the server equipment provided via one said gateway, the relay transmits a beacon parameter recovery message to the server equipment;

in the case of a response message from the server equipment provided via one said gateway, the relay schedules the sending of said beacons and schedules listening out during each said timeslot, said response message including information representing each said timeslot.

3. The method according to claim 1, wherein, on reception by one said relay of an original message sent by one said terminal in Class A' communication mode, the relay performs:

when the original message is a registration message from the said terminal to the server equipment, said relay propagaes said original message toward the server equipment, and on reception of a response message coming from the server equipment, said relay considers that said terminal is attached to said relay;

when the original message is another message, said relay propagates said original message toward the server equipment only if said terminal is attached to said relay.

4. The method according to claim 3, wherein, on reception of a message propagated by one or more gateways, when the received message includes a message relayed by one said relay, the server equipment determines whether the relayed message has also been received directly via said gateway and, if such is the case, the server equipment performs:

processing the relayed message for obtaining a response message to be addressed to the terminal that sent the message that has been relayed;

transmitting said response message to a gateway so that said gateway propagates said response message toward said terminal in one said reception window defined in Class A communication mode with respect to the transmission by said terminal of the message that was relayed;

transmitting to the relay a detachment message indicating to said relay that said terminal is no longer attached to said relay;

and wherein the terminal listens out in each said reception window defined in Class A communication mode and in each said reception window defined in Class A' communication mode and, when said terminal receives a response message in one said reception window defined in Class A communication mode, said terminal switches into Class A communication mode.

5. The method according to claim 1, wherein two reception windows are defined in Class A communication mode and two reception windows are defined in Class A' communication mode.

6. The method according to claim 1, wherein each reception window in Class A' communication mode has a duration greater than each corresponding reception window in Class A communication mode.

7. The method according to claim 1, wherein the server equipment comprises at least one relay application, each relay application being responsible for performing the encapsulations and de-encapsulations vis-à-vis one or more of said relays.

8. A method implemented by a relay in the context of a transmission in a communication system including server equipment and a gateway connected to the server equipment, each gateway being configured to communicate with a terminal via an LPWAN communication network using a so-called Class A communication mode defined as follows:

said terminal wishing to communicate with the server equipment directly via one said gateway transmits an original message to the server equipment, wherein the original message comprises a registration message from said terminal to the server equipment or another message from said terminal to the server equipment;

said terminal listens out for any response message from the server equipment propagated via one said gateway during at least one reception window defined with respect to a transmission time for said original message by said terminal;

wherein the communication system further includes said relay, which is seen as a terminal by each gateway, said relay using the Class A communication mode to communicate with one or more said gateways, and using, to communicate with one or more terminals, another communication mode, referred to as Class A', defined as follows:

the relay transmits beacons at regular intervals, each beacon including information representing at least one timeslot predefined with respect to said beacon;

the relay listens out for any original messages sent by one or more terminals to the server equipment only during each said timeslot;

in the case of a response message from the server equipment provided via one said gateway in Class A communication mode, said relay propagates the response message toward said terminal using at least one other reception window defined with respect to a transmission time for said original message by said terminal, each said other reception window being offset subsequently by a predefined time with respect to each reception window defined in Class A communication mode; and wherein, on reception by said relay of an original message sent by one said terminal in Class A' communication mode, said relay performs:

performing an encapsulation of the original message in another message intended for the server equipment;

transmitting said other message in Class A communication mode so that said gateway propagates said other message toward the server equipment;

in the case of a response message from the server equipment provided via one said gateway using a reception window defined in Class A communication mode with respect to the transmission of said other message via said relay, performing a de-encapsulation of another response message contained in said response message and propagating said other response message toward said terminal in one said other reception window defined in Class A' communication mode with respect to the transmission of said original message by said terminal.

9. Non-transitory information storage medium storing a computer program comprising a set of instructions causing an execution, by a processor, of the method according to claim 8, when said computer program is executed by said processor.

10. A method implemented by a terminal in the context of a transmission in a communication system including server equipment and gateway connected to the server equipment, said terminal being configured to communicate with said gateway via an LPWAN communication network using a so-called Class A communication mode, defined as follows:

said terminal wishing to communicate with the server equipment directly via one said gateway transmits an original message to the server equipment, wherein the original message comprises a registration message from said terminal to the server equipment or another message from said terminal to the server equipment;

said terminal listens out for any response message from the server equipment propagated via one said gateway during at least one reception window defined with respect to a transmission time for said original message by said terminal;

wherein, the communication system further including relay, said terminal is configured to communicate with each relay in accordance with another so-called Class A' communication mode, defined as follows:

the terminal receives beacons sent by one said relay, each beacon including information representing at least one timeslot predefined with respect to said beacon;

said terminal wishing to communicate with the server equipment via said relay transmits an original message to the server equipment only during one said timeslot;

said terminal listens out for any response message from the server equipment propagated via said relay during at least one other reception window defined with respect to a transmission time for said original message by said terminal, each said other reception window being offset subsequently by a predefined time with respect to each reception window defined in Class A communication mode.

11. A method implemented by server equipment in a context of a transmission in a communication system including said server equipment and a gateway connected to the server equipment, each gateway being configured to communicate with at least one terminal via an LPWAN communication system, wherein, the communication system further including a relay, on reception of a message propagated by one or more gateways, when the received message includes a message relayed by the relay, the server equipment performs:

receiving, for the relay using a Class A communication mode, a registration message from said terminal to the server equipment or another message from said terminal to the server equipment;

performing a de-encapsulation of the relayed message;

processing the relayed message for obtaining a response message to be addressed to the terminal that sent the message that was relayed;

encapsulating the response message in another response message to be addressed to the relay; and transmitting said other response message to a gateway, so that said gateway propagates said other response message toward said relay.

12. A communication system including server equipment and gateway connected to the server equipment, each gateway being configured to communicate with a terminal via an LPWAN communication network using a so-called Class A communication mode, defined as follows:

said gateway is configured to receive an original message coming from one said terminal and propagates said received original message toward the server equipment, wherein the original message comprises a registration message from said terminal to the server equipment or another message from said terminal to the server equipment;

on reception of a response message from the server equipment, said gateway is configured to propagate the response message toward said terminal using at least one reception window (Rx1, Rx2) defined with respect to a transmission time of said original message by said terminal;

wherein the communication system further includes relay seen as a terminal by each gateway, each relay being configured to use the Class A communication mode to communicate with one or more of said gateways, and to use, to communicate with one or more terminals, another so-called Class A' communication mode, defined as follows:

the relay is configured to transmit beacons at regular intervals, each beacon including information representing at least one timeslot predefined with respect to said beacon;

the relay is configured so as to listen out for any original messages sent by one or more terminals to the server equipment only during each said timeslot;

in the case of a response message from the server equipment provided via one said gateway in Class A communication mode, said relay is configured to propagate the response message toward said terminal using at least one other reception window defined with respect to a transmission time of said original message by said terminal, each said other reception window being offset subsequently by a predefined time with respect to each reception window defined in Class A communication mode; and wherein, on reception by one said relay of an original message sent by one said terminal in Class A' communication mode, said relay comprises circuitry configured for:

performing an encapsulation of the original message in another message intended for the server equipment;

transmitting said other message in Class A communication mode, so that said gateway propagates said other message toward the server equipment;

in the case of a response message from the server equipment provided via one said gateway using a reception window defined in Class A communication mode with respect to the transmission of said other message by said relay, performing a de-encapsulation of another response message contained in said response message and propagating said other response message toward said terminal in one said other reception window defined in Class A' communication mode with respect to the transmission of said original message by said terminal; and wherein, on reception of a message propagated by one or more gateways, when the received message includes a message relayed by one said relay, the circuitry of the server equipment is configured for:

performing a de-encapsulation of the relayed message;

processing the relayed message for obtaining a response message to be addressed to the terminal that sent the message that was relayed;

performing an encapsulation of the response message in another response message to be addressed to the relay; and transmitting said other response message to a gateway so that said gateway propagates said other response message toward said relay in one said reception window defined in Class A communication mode with respect to the transmission by said terminal of said propagated message.

13. A relay intended to be used in a communication system including server equipment and gateway connected to the server equipment, each gateway being configured to communicate with a terminal via an LPWAN communication network using a so-called Class A communication mode, defined as follows:
- said terminal wishing to communicate with the server equipment directly via one said gateway is configured to transmit an original message to the server equipment, wherein the original message comprises a registration message from said terminal to the server equipment or another message from said terminal to the server equipment;
- said terminal is configured so as to listen out for any response message from the server equipment propagated via one said gateway during at least one reception window defined with respect to a transmission time of said original message by said terminal;
- wherein, said relay being seen as a terminal by each gateway, said relay is configured to use the Class A communication mode to communicate with one or more of said gateways, and to use, for communicating with one or more terminals, another so-called Class A' communication mode, defined as follows:
- the relay is configured to transmit beacons at regular intervals, each beacon including information representing at least one timeslot predefined with respect to said beacon;
- the relay is configured so as to listen out for any original messages sent by one or more terminals to the server equipment only during each said timeslot;
- in the case of a response message from the server equipment provided via one said gateway in Class A communication mode, said relay is configured to propagate the response message toward said terminal using at least one other reception window defined with respect to a transmission time of said original message by said terminal, each said other reception window being offset subsequently by a time predefined with respect to each reception window defined in Class A communication mode; and
- wherein, on reception by said relay of an original message sent by one said terminal in Class A' communication mode, said relay comprises circuitry configured for:
- performing an encapsulation of the original message in another message intended for the server equipment;
- transmitting said other message in Class A communication mode so that said gateway propagates said other message toward the server equipment;
- in the case of a response message from the server equipment provided via one said gateway using a reception window defined in Class A communication mode with respect to the transmission of said other message by said relay, performing a de-encapsulation of another response message contained in said response message and propagating said other response message toward said terminal in one said other reception window defined in Class A' communication mode with respect to the transmission of said original message by said terminal.

14. A terminal intended to be used with a communication system including server equipment and gateway connected to the server equipment, said terminal being configured to communicate with said gateway via an LPWAN communication network using a so-called Class A communication mode, defined as follows:
- said terminal wishing to communicate with the server equipment directly via one said gateway is configured to transmit an original message to the server equipment, wherein the original message comprises a registration message from said terminal to the server equipment or another message from said terminal to the server equipment;
- said terminal is configured to listen out for any response message from the server equipment propagated via one said gateway during at least one reception window defined with respect to a transmission time of said original message by said terminal;
- wherein, the communication system further including relay, said terminal is configured to communicate with each relay in another so-called Class A' communication mode, defined as follows:
- the terminal is configured to receive beacons sent by one said relay, each beacon including information representing at least one timeslot predefined with respect to said beacon;
- said terminal wishing to communicate with the server equipment via said relay is configured to transmit an original message to the server equipment only during one said timeslot;
- said terminal is configured to listen out for any response message from the server equipment propagated via said relay during at least one other reception window defined with respect to a transmission time of said original message by said terminal, each said other reception window being offset subsequently by a time predefined with respect to each reception window defined in Class A communication mode.

15. Server equipment intended to be used in a communication system including said server equipment and gateway connected to the server equipment, each gateway being configured to communicate with terminal via an LPWAN communication network,
- wherein, the communication system further including relay, on reception of a message propagated by one or more gateways, when the received message includes a message relayed by one said relay, the server equipment comprises circuitry configured for:
- receiving, from the relay using a Class A communication mode, a registration message from said terminal to the server equipment or another message from said terminal to the server equipment;
- performing a de-encapsulation of the relayed message;
- processing the relayed message for obtaining a response message to be addressed to the terminal that sent the message that was relayed;
- performing an encapsulation of the response message in another response message to be addressed to the relay; and
- transmitting said other response message to a gateway so that said gateway propagates said other response message toward said relay.

* * * * *